(12) United States Patent
Kawamura et al.

(10) Patent No.: US 7,974,494 B2
(45) Date of Patent: Jul. 5, 2011

(54) IMAGE CONTROL FROM COMPOSED COMPOSITE IMAGE USING HID SIGNAL CONVERSION TO SOURCE IMAGE COORDINATES

(75) Inventors: Takuya Kawamura, Kanagawa-ken (JP); Shinya Murai, Kanagawa-ken (JP); Kotaro Ise, Saitama-ken (JP); Masataka Goto, Kanagawa-ken (JP); Keiichi Yamaguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1313 days.

(21) Appl. No.: 11/523,806

(22) Filed: Sep. 20, 2006

(65) Prior Publication Data

US 2007/0063972 A1 Mar. 22, 2007

(30) Foreign Application Priority Data

Sep. 21, 2005 (JP) .................. 2005-274472

(51) Int. Cl.
*G06K 9/20* (2006.01)
*G06K 9/36* (2006.01)
*G09G 5/00* (2006.01)
*G06F 3/048* (2006.01)
(52) U.S. Cl. .................. 382/284; 345/642; 715/764
(58) Field of Classification Search .............. 382/284; 345/156, 157, 173, 634–637
See application file for complete search history.

(56) References Cited

U.S. PATENT DOCUMENTS

| 5,159,667 A | 10/1992 | Borrey et al. |
| 5,467,450 A | 11/1995 | Coelho |
| 5,487,143 A | 1/1996 | Southgate |
| 5,572,647 A | 11/1996 | Blades |
| 5,675,755 A | 10/1997 | Trueblood |
| 5,689,665 A | 11/1997 | Mitsui et al. |

(Continued)

FOREIGN PATENT DOCUMENTS

JP 5-103324 4/1993

(Continued)

OTHER PUBLICATIONS

Search Report dated May 7, 2010 in JP Application No. 2005-274472 with English translation.

(Continued)

*Primary Examiner* — Yubin Hung
(74) *Attorney, Agent, or Firm* — Nixon & Vanderhye, P.C.

(57) ABSTRACT

Image control involves receiving source images defined with respect to respective source coordinate systems from source image generators also respectively associated with source IDs. The source images are composed to generate a composite image defined with respect to a composed coordinate system, and the composed image is sent to a viewer which displays the composed image and outputs an HID signal which indicates information defined with respect to the composed coordinate system. A layout manager stores source IDs respectively associated with layout information including position and size of at least one of the source images. An image composer composes the source images according to the layout information. An analyzer analyzes the HID signal for editing layout information stored in the layout manager, and determines a source ID a source image according to the layout information. The HID signal defined with respect to the composed coordinate system is converted to an HID signal defined with respect to the source coordinate system corresponding to the determined source image. An operator then sends the converted HID signal to the source image generator associated with the determined source ID.

24 Claims, 29 Drawing Sheets

U.S. PATENT DOCUMENTS

| | | | |
|---|---|---|---|
| 5,751,959 A | 5/1998 | Sato et al. | |
| 5,764,277 A | 6/1998 | Loui et al. | |
| 5,796,402 A | 8/1998 | Ellison-Taylor | |
| 5,886,694 A * | 3/1999 | Breinberg et al. | 715/788 |
| 5,889,932 A | 3/1999 | Adegeest et al. | |
| 6,031,530 A | 2/2000 | Trueblood | |
| 6,043,817 A * | 3/2000 | Bolnick et al. | 715/788 |
| 6,122,005 A | 9/2000 | Sasaki et al. | |
| 6,760,638 B1 | 7/2004 | Love et al. | |
| 7,019,750 B2 | 3/2006 | Sakaguchi | |
| 7,050,112 B2 | 5/2006 | Rieder et al. | |
| 7,559,031 B2 | 7/2009 | Kawamura et al. | |
| 7,710,449 B2 | 5/2010 | Amiel et al. | |
| 2001/0027398 A1 | 10/2001 | Kohno | |
| 2002/0075199 A1* | 6/2002 | Asahi et al. | 345/1.1 |
| 2004/0008635 A1 | 1/2004 | Nelson et al. | |
| 2004/0119750 A1* | 6/2004 | Harrison | 345/773 |
| 2004/0130575 A1* | 7/2004 | Tai et al. | 345/773 |
| 2004/0261037 A1 | 12/2004 | Ording et al. | |
| 2005/0125742 A1 | 6/2005 | Grotjohn et al. | |
| 2005/0188321 A1 | 8/2005 | Adams et al. | |
| 2005/0264648 A1 | 12/2005 | Ivashin et al. | |
| 2005/0286444 A1 | 12/2005 | Yang et al. | |
| 2006/0158510 A1 | 7/2006 | Lia et al. | |
| 2006/0192848 A1 | 8/2006 | Ni | |
| 2006/0274195 A1 | 12/2006 | Eshkoli | |
| 2007/0120967 A1 | 5/2007 | Eshkoli et al. | |

FOREIGN PATENT DOCUMENTS

| | | |
|---|---|---|
| JP | 6-141310 | 5/1994 |
| JP | 6-282405 | 10/1994 |
| JP | 7-046564 | 2/1995 |
| JP | 7-084905 | 3/1995 |
| JP | A-7-105106 | 4/1995 |
| JP | 8-289189 | 11/1996 |
| JP | 8-294100 | 11/1996 |
| JP | 8-297617 | 11/1996 |
| JP | 9-023414 | 1/1997 |
| JP | 9-081107 | 3/1997 |
| JP | 9-081475 | 3/1997 |
| JP | 9-149396 | 6/1997 |
| JP | 9-237154 | 9/1997 |
| JP | 10-164532 | 6/1998 |
| JP | 11-234643 | 8/1999 |
| JP | 2000-259535 | 9/2000 |
| JP | A-2001-157186 | 6/2001 |
| JP | 2002-342775 | 11/2002 |
| JP | A-2003-134382 | 5/2003 |
| JP | 2003-323387 | 11/2003 |
| JP | 2004-234426 | 8/2004 |
| JP | 2004-240577 | 8/2004 |
| JP | 2005-149241 | 6/2005 |
| JP | 2005-191642 | 7/2005 |
| JP | 2005-328484 | 11/2005 |
| JP | 2005-536132 | 11/2005 |
| JP | 2006-201709 | 8/2006 |

OTHER PUBLICATIONS

Kawamura et al., U.S. Appl. No. 11/335,823, filed Jan. 20, 2006.

* cited by examiner

| ID | x | y | w | h | Layer |
|----|-----|-----|-----|-----|-------|
| V1 | v1x | v1y | v1w | v1h | v1l |
| V2 | v2x | v2y | v2w | v2h | v2l |
| Vn | vnx | vny | vnw | vnh | vnl |
| P  | px  | py  | pw  | ph  | pl  |
| F  | fx  | fy  | fw  | fh  | fl  |

*Fig. 5(a)*

| ID | x | y | w | h | Layer |
|----|----|----|----|----|-------|
| V1 | 15 | 15 | 25 | 25 | 3 |
| V2 | 45 | 45 | 50 | 50 | 4 |
| Vn | 65 | 20 | 25 | 25 | 5 |
| P  | 60 | 10 | 1  | 1  | 1 |
| F  | 15 | 15 | 25 | 25 | 2 |

*Fig. 5(b)*

| ID | x | y | w | h | Layer |
|---|---|---|---|---|---|
| V1 | 15 | 15 | 25 | 25 | 3 |
| V2 | 45 | 45 | 50 | 50 | 4 |
| Vn | 65 | 20 | 25 | 25 | 5 |
| P | 60 | 10 | 1 | 1 | 1 |
| F | 15 | 15 | 25 | 25 | 2 |

*Fig. 12(a)*

| ID | x | y | w | h | Layer |
|---|---|---|---|---|---|
| V1 | 40 | 15 | 25 | 25 | 3 |
| V2 | 45 | 45 | 50 | 50 | 4 |
| Vn | 65 | 20 | 25 | 25 | 5 |
| P | 60 | 10 | 1 | 1 | 1 |
| F | 40 | 15 | 25 | 25 | 2 |

*Fig. 12(b)*

| ID | x | y | w | h | Layer |
|----|----|----|----|----|----|
| V1 | 15 | 15 | 25 | 25 | 3 |
| V2 | 45 | 45 | 50 | 50 | 4 |
| Vn | 65 | 20 | 25 | 25 | 5 |
| P | 60 | 10 | 1 | 1 | 1 |
| F | 15 | 15 | 25 | 25 | 2 |

*Fig. 14(a)*

| ID | x | y | w | h | Layer |
|----|----|----|----|----|----|
| V1 | 15 | 15 | 50 | 50 | 3 |
| V2 | 45 | 45 | 50 | 50 | 4 |
| Vn | 65 | 20 | 25 | 25 | 5 |
| P | 60 | 10 | 1 | 1 | 1 |
| F | 15 | 15 | 50 | 50 | 2 |

*Fig. 14(b)*

| ID | x | y | w | h | Layer | Focus |
|---|---|---|---|---|---|---|
| V1 | v1x | v1y | v1w | v1h | v1l | v1f |
| V2 | v2x | v2y | v2w | v2h | v2l | v2f |
| Vn | vnx | vny | vnw | vnh | vnl | vnf |
| P | px | py | pw | ph | pl | pf |

*Fig. 16(a)*

| ID | x | y | w | h | Layer | Focus |
|---|---|---|---|---|---|---|
| V1 | 15 | 15 | 25 | 25 | 3 | 1 |
| V2 | 45 | 45 | 50 | 50 | 4 | 0 |
| Vn | 65 | 20 | 25 | 25 | 5 | 0 |
| P | 60 | 10 | 1 | 1 | 1 | 0 |

*Fig. 16(b)*

1114-K: IMAGE STORAGE

| ID | x | y | w | h | Layer | x' | y' | w' | h' |
|----|---|---|---|---|-------|----|----|----|----|
| V1 | v1x | v1y | v1w | v1h | v1l | v1x' | v1y' | v1w' | v1h' |
| V2 | v2x | v2y | v2w | v2h | v2l | v2x' | v2y' | v2w' | v2h' |
| Vn | vnx | vny | vnw | vnh | vnl | vnx' | vny' | vnw' | vnh' |
| P | px | py | pw | ph | pl | px' | py' | pw' | ph' |
| F | fx | fy | fw | fh | fl | fx' | fy' | fw' | fh' |

| ID | x | y | w | h | Layer | x' | y' | w' | h' |
|---|---|---|---|---|---|---|---|---|---|
| V1 | 15 | 15 | 25 | 25 | 2 | 0 | 0 | 100 | 100 |
| V2 | 45 | 45 | 50 | 50 | 3 | 0 | 0 | 100 | 100 |
| Vn | 65 | 20 | 25 | 25 | 4 | 0 | 0 | 100 | 100 |
| P | 47 | 47 | 1 | 1 | 1 | 0 | 0 | 100 | 100 |

*Fig. 23(a)*

| ID | x | y | w | h | Layer | x' | y' | w' | h' |
|---|---|---|---|---|---|---|---|---|---|
| V1 | 15 | 15 | 25 | 25 | 2 | 0 | 0 | 100 | 100 |
| V2 | 45 | 45 | 50 | 50 | 3 | 0 | 0 | 100 | 100 |
| Vn | 65 | 20 | 25 | 25 | 5 | 0 | 0 | 100 | 100 |
| P | 47 | 47 | 1 | 1 | 1 | 0 | 0 | 100 | 100 |
| cV1 | 17 | 17 | 25 | 25 | 2 | 80 | 0 | 20 | 100 |

*Fig. 23(b)*

| ID  | x   | y  | w  | h  | Layer | x' | y' | w'  | h'  |
|-----|-----|----|----|----|-------|----|----|-----|-----|
| V1  | 15  | 15 | 25 | 25 | 3     | 0  | 0  | 100 | 100 |
| V2  | 45  | 45 | 50 | 50 | 4     | 0  | 0  | 100 | 100 |
| Vn  | 65  | 20 | 25 | 25 | 5     | 0  | 0  | 100 | 100 |
| P   | 47  | 47 | 1  | 1  | 1     | 0  | 0  | 100 | 100 |
| cV1 | -37 | 45 | 50 | 50 | 2     | 80 | 0  | 20  | 100 |

*Fig. 26*

IMAGE CONTROL FROM COMPOSED COMPOSITE IMAGE USING HID SIGNAL CONVERSION TO SOURCE IMAGE COORDINATES

CROSS-REFERENCE TO RELATED APPLICATIONS

This application is based upon and claims the benefit of priority under 35 U.S.C. §119 from prior Japanese Patent Application P2005-274472 filed on Sep. 21, 2005, the entire contents of which are hereby incorporated by reference.

BACKGROUND

1. Technical Field

This application relates to control of composite images composed of source images by use of HID (Human Interface Device) signals (e.g., from a mouse).

2. Related Art

In one known system, a personal computer (e.g., a "client") receives image information from a remote computer (e.g., a "server"), and sends signal to the remote computer to request updated image information.

A "Remote Desktop" function is also known which controls a remote computer with a personal computer. Microsoft® Windows® XP has such a "Remote Desktop" function where a personal computer sends operations inputted from local user interfaces (e.g., a mouse and a keyboard), to a remote computer. A remote computer sends back image data processed with operations sent from the personal computer.

As will be appreciated, image information may be compressed when being sent between computers to reduce network load.

On the other hand, Japanese Patent Publication (Kokai) 8-297617 discloses a remote computer sending drawing instructions (instead of an image), to a personal computer where an image is processed using the received drawing instructions. The amount of data required for such drawing instructions is smaller than for an image, so network load can be reduced in this way as well. Virtual Networks Computing (VNC) uses the same concept.

For example, in a "Remote Desktop" a window can be provided in a viewer image sent from a terminal. A window can be moved and resized by user operations on the viewer. In addition, an object, such as a rectangular symbol in a window also can be moved and resized by user operations on the viewer.

On the other hand, in a multipoint video communication system, terminals exchange video signals and sound signals with each other. One way to develop a multipoint video communication system is called distributed multipoint communication, in which terminals are connected to each other. Another way is called integrated multipoint communication, in which terminals are connected to a server (e.g., an MCU or multipoint control unit) that composes images and sounds and sends composed information back to the terminals.

Hereinafter, an image sent from a terminal is called a "source image".

Some examples of ways to determine source image position on a composed image are described in Japanese Patent Publication (Kokai) 8-297617 etc. One way is for an MCU to determine a source image position automatically. For example, an MCU may allocate equal space for each source image in a composed image. An MCU may also stretch one source image to a full window size and put other source images on a full window-sized source image (Picture-in-Picture). Another way is for a terminal to send position designation information to an MCU. A user may choose a position pattern from a plurality of predetermined patterns on a terminal, and the terminal can then send chosen position pattern information to an MCU.

It is also possible to combine a terminal and a viewer. That is, a terminal-viewer may send source image and position pattern information to an MCU which then generates a composed image based on source image and position pattern information, which image is then sent to a terminal-viewer. A user may resize source images in a composed image on a terminal viewer display. However, if a composed image size is reduced, sizes of objects in a source image on a composed image are also reduced and this may present problems.

For example, a source image may include some objects (e.g., a menu button of a web browser). However, such small objects may be difficult to be "clicked-on" within terminal-viewer display—especially if the image containing such objects is reduced in size.

BRIEF SUMMARY

According to one aspect of an exemplary embodiment, an image control apparatus receives source images defined with respectively corresponding source coordinate systems from source image generators associated with respective source IDs. The source images are composed to generate a composed (i.e., composite) image (e.g., defined with a single composed coordinate system) which is then sent to a viewer which displays the composed image and outputs an HID (Human Interface Device) signal which indicates information defined with respect to the composed coordinate system. The information includes a layout manager configured to store source IDs associated with a plurality of layout data respectively, each including position and size of a corresponding one of the source images. An image composer is also included, configured to generate the composed image by composing source images according to the plurality of layout data. An analyzer is configured to analyze the HID signal for editing plural layout data stored in the layout manager, and to determine a source ID associated with a source image according to the edited plurality of layout data and to convert the HID signal to a converted HID signal which indicates information defined with respect to the source coordinate system that defines the thus determined source image. An operator is also included and configured to send the converted HID signal to the source image generator associated with the determined source ID.

Another non-limiting aspect of the exemplary embodiment is an image control method for controlling an apparatus which processes images of the type just described.

Another non-limiting aspect of the exemplary embodiment is an image control program suitable for execution by a computer for processing images of the type just described.

BRIEF DESCRIPTION OF THE DRAWINGS

The exemplary embodiments and attendant advantages therefore are best understood from the following description when read in connection with the accompanying Figures, wherein:

FIGS. 5(a)-(b) are examples of a layout management table.

FIGS. 12(a)-(b) are examples of a layout management table according to FIGS. 11(a)-(b) respectively.

FIGS. 14(a)-(b) are examples of a layout management table according to FIGS. 13(a)-(b) respectively.

FIGS. 16(a)-(b) are examples of a layout management table according to FIGS. 15(a)-(b) respectively.

FIGS. 23(a)-(b) are examples of a layout management table before and after detection of an operative area.

FIG. 26 is an example of a layout management table according to FIG. 25.

DETAILED DESCRIPTION OF EXEMPLARY EMBODIMENTS

Figure 1:
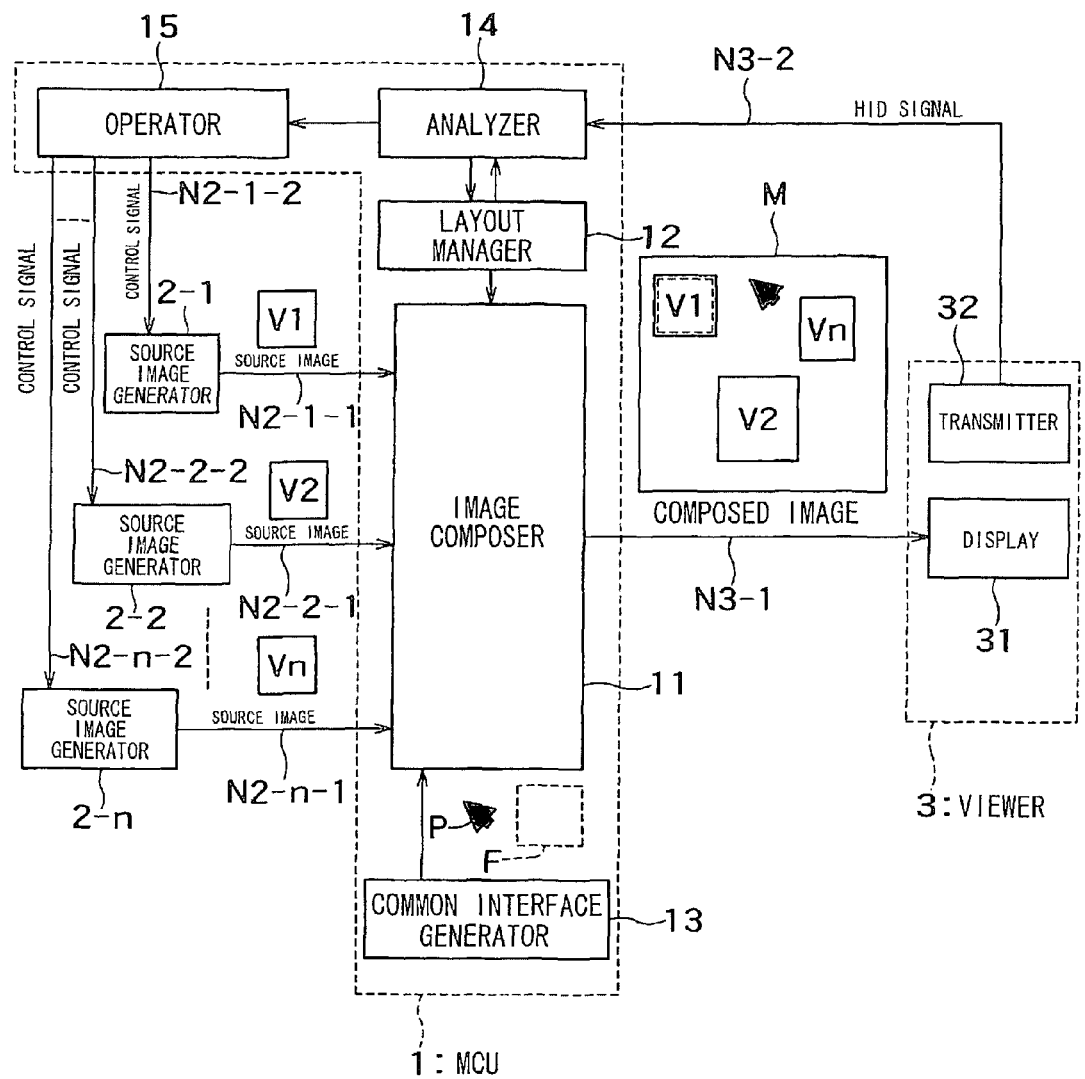
FIG. 1 is a diagram illustrating a remote-control system according to first embodiment.

In the FIGURES referred to below, like reference numerals designate identical or corresponding parts through the several views.

First Exemplary Embodiment

FIG. 1 illustrates a diagram of an example of a first non-limiting embodiment of a remote-control system.

A remote-control system includes a plurality of source image generators (numbered from 2-1 to 2-n), a viewer 3, and MCU 1 which communicate with each other through network paths as shown.

Figure 2A:
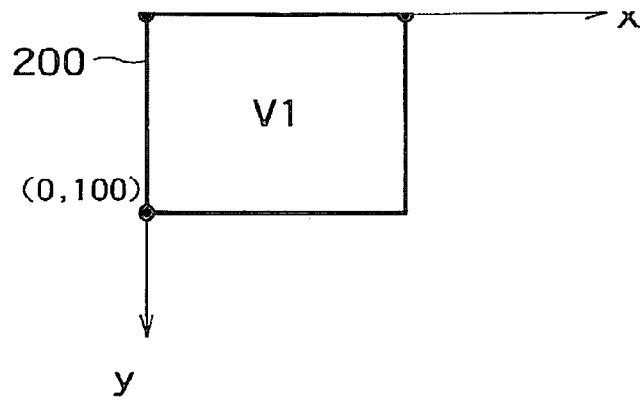
FIGS. 2(a)-(c) are diagrams illustrating an example of source images and coordinate systems.

Source image generators 2-1 and 2-n can be controlled from a remote location through a network. Source image generators 2-1 to 2-n may be PCs. Source image generator 2-1 transmit a source image V1 with a source ID "V1" to MCU 1 through network path N2-1-1. In this embodiment, source image generator 2-1 treats a specification of source image V1 as a normalized value such as 100 percent for each of a horizontal direction x and a vertical direction y shown in FIG. 2(a) as coordinate system 200.

Figure 2B:
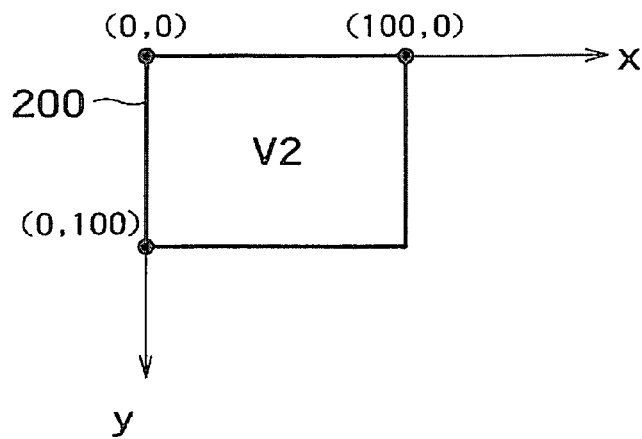
Figure 2C:
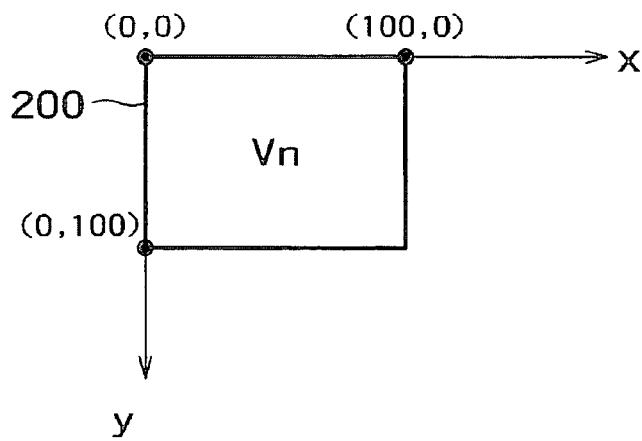
Figure 3A:
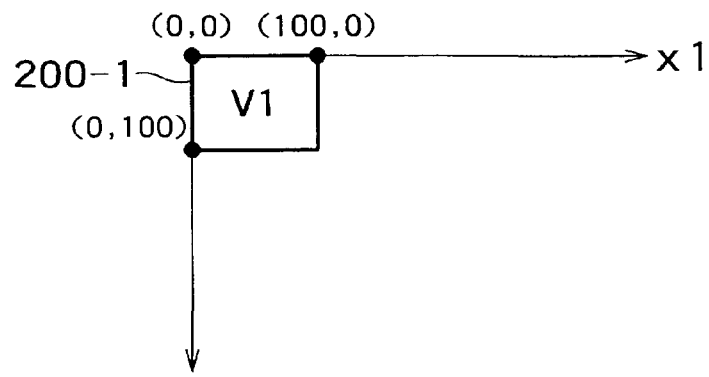
FIGS. 3(a)-(c) are diagrams illustrating another example of source images and coordinate systems.
Figure 3B:
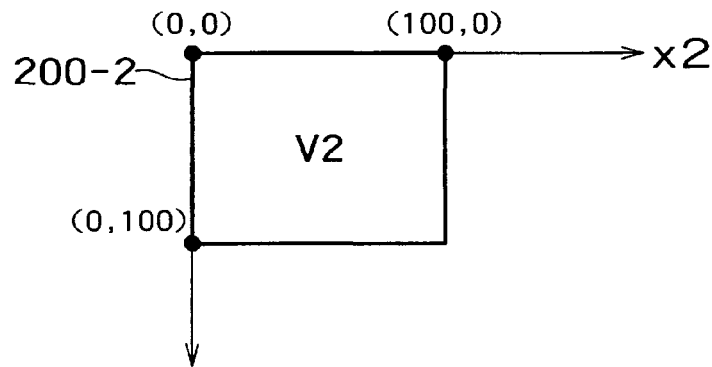
Figure 3C:
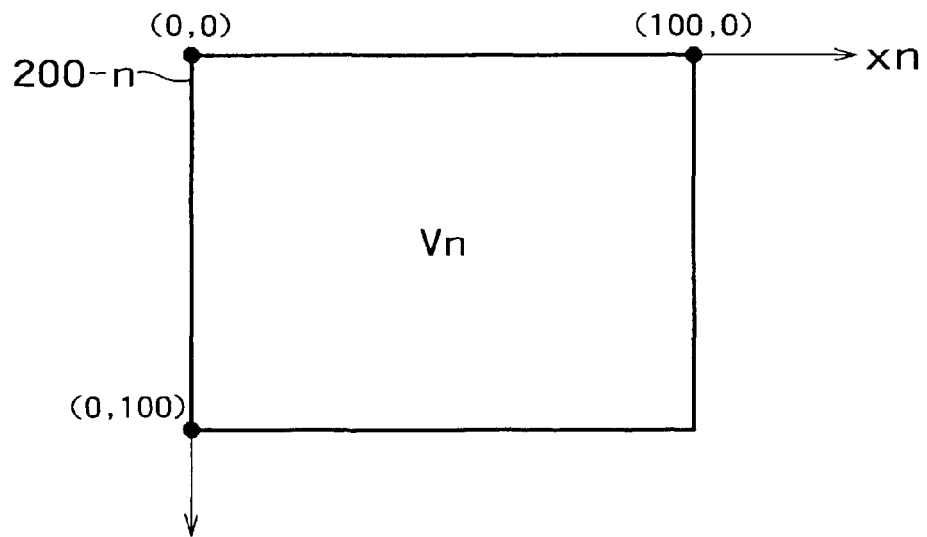

Source image generator 2-1 controls pointer P on a source image according to a control signal sent from MCU 1. Moreover, source image generator 2-1 detects an event based on the position of pointer P. Source image generator 2-2 also treats a specification of source image V2 as a normalized value (e.g., 100 percent) for each of a horizontal direction x and a vertical direction y (as shown in FIG. 2(b)) as coordinate system 200. Source image generator 2-n also treats a specification of a source image Vn as a normalized value (e.g., 100 percent) for each of a horizontal direction x and a vertical direction y (as shown in FIG. 2(c)) as coordinate system 200. Of course, the scale of coordinate systems 200 may be different from each other as shown in FIGS. 3(a)-(c) which show that a coordinate system for source image V1 200-1, coordinate system for source image V2 200-2, and coordinate system for source image Vn 200-n are each different from each other in absolute value.

Viewer 3 includes display 31 and transmitter 32. Display 31 displays composed image M sent from MCU 1 through network path N3-1. Transmitter 32 generates HID (Human Interface Device) signals based on a user interface device (e.g., a mouse), and sends the HID signals through network path N3-2. The HID signal includes information of distance moved in each of the x and y directions, click events, and so on.

Figure 4:
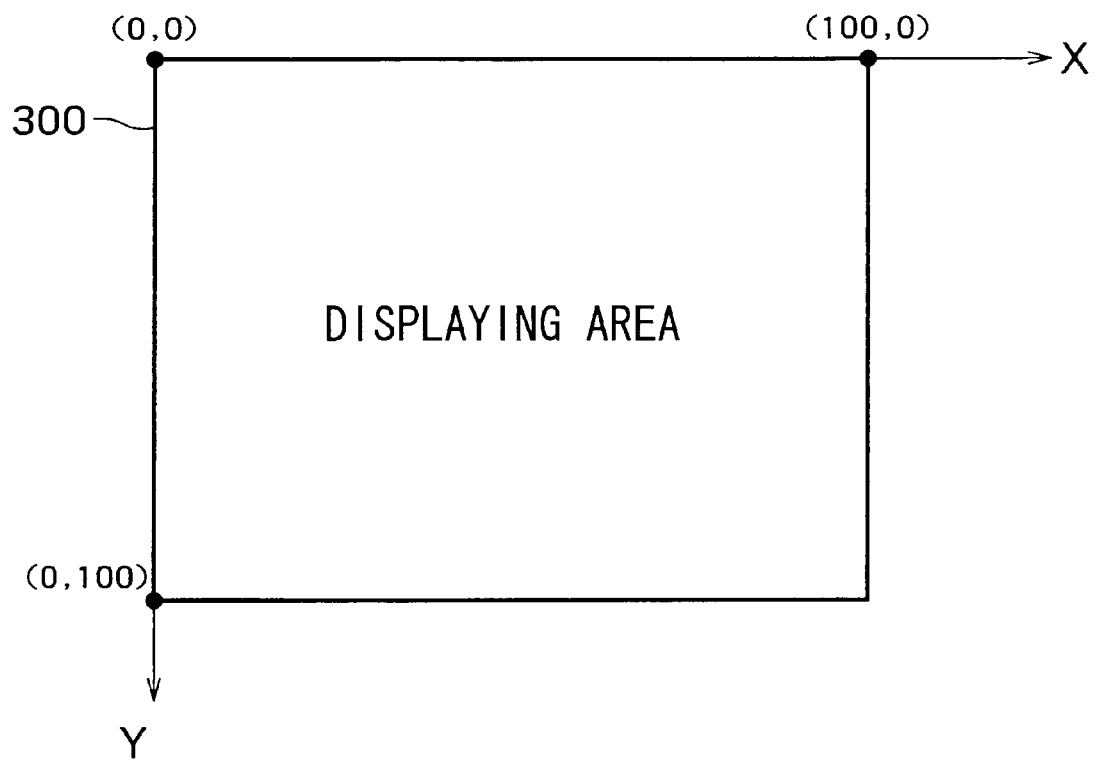
FIG. 4 is a diagram illustrating a composed image and its coordinate system.

In this embodiment, viewer 3 treats specification of a displaying area as a normalized value (e.g., 100 percent) for each of a horizontal direction x and a vertical direction y (as shown in FIG. 4 with coordinate system 300). Transmitter 32 also treats a position of pointer P as being within a normalized coordinate system. Transmitter 32 may disregard a position of pointer P when it moves out of the normalized displaying area 0<x<100 and 0<y<100 as shown in FIG. 4.

MCU 1 includes image composer 11, layout manager 12, common interface generator 13, analyzer 14 and operator 15.

The image composer 11 receives source images from source image generators through the network. More specifically, image composer 11 receives a source image from source image generator 2-1 through network path N2-1-1. Image composer 11 receives a source image from source image generator 2-2 through network path N2-2-1. Image composer 11 receives a source image from source image generator 2-n through network path N2-n-1. Image composer 11 composes such source images and a common interface image generated by common interface generator 13 based on layout information provided from layout manager 12. Image composer 11 transmits the composed image M to viewer 3 through network path N3-1.

Layout manager 12 identifies source image generators 2-1 to 2-n. Source image generators are respectively associated with source IDs V1 to Vn. Source images V1 to Vn are also respectively associated with source IDs V1 to Vn. Therefore, a source image generator and source image are associated with each other through the source ID.

Layout manager 12 stores layout information corresponding to source ID. FIG. 5(a) is an example of layout information stored as a layout management table in layout manager 12. FIG. 5(b) shows exemplary values for each parameter of the layout management table. In FIGS. 5(a)-(b) source ID V1 is associated with specification of source image V1 (e.g., such as an upper left corner position v1x, v1y, a horizontal width v1w, and a vertical height v1h). Source ID V1 is also associated with layer ID v11 that corresponds to a layer in a composite image.

Figure 6A:
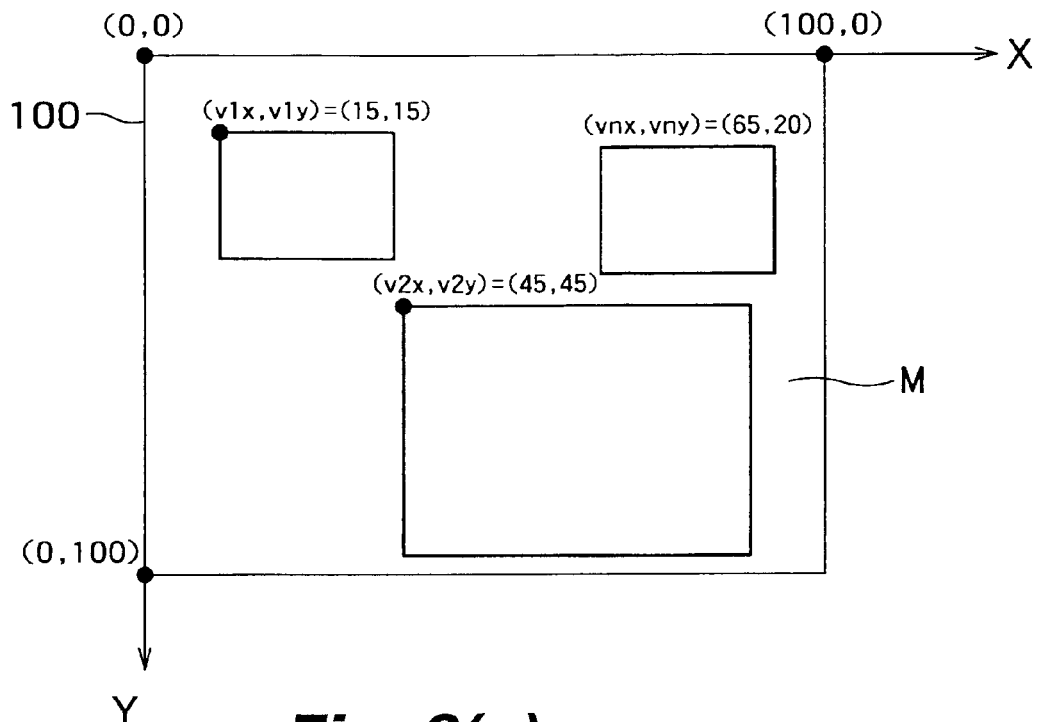
FIGS. 6(a)-(b) are diagrams illustrating composed images based on FIGS. 5(a)-(b) respectively.
Figure 6B:
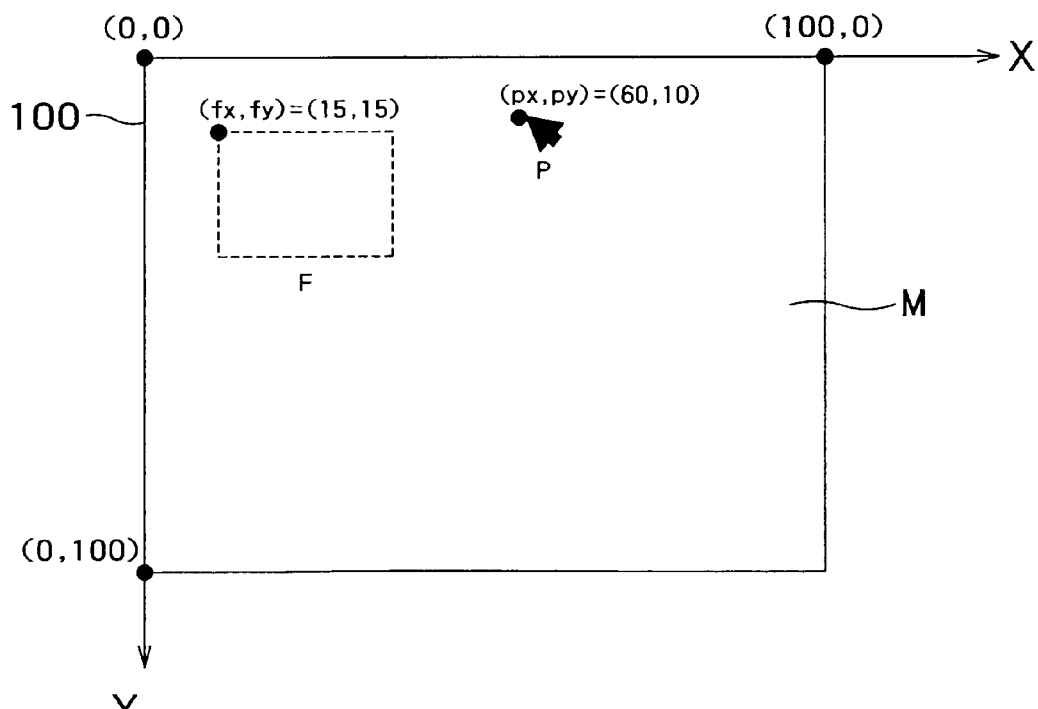

Each of the source IDs is associated with specification of the source image. A source ID P is associated with pointer P on the composite image. Source ID F is associated with an active frame described later. For example, layout of source images on composed image M is shown in FIG. 6(a) when parameters on the layout management table are defined as in FIG. 5(b). A layout of the pointer P and an activated frame on composed image M is shown in FIG. 6(b) when parameters on the layout management table are defined as in FIG. 5(b). The pointer P is designated with an arrow P in FIG. 6(b). The activated frame is designate with a broken rectangle in FIG. 6(b). The activated frame is overlaid on an active source image on composed image M. The user of viewer 3 can control the active source image with pointer P.

Figure 15A:
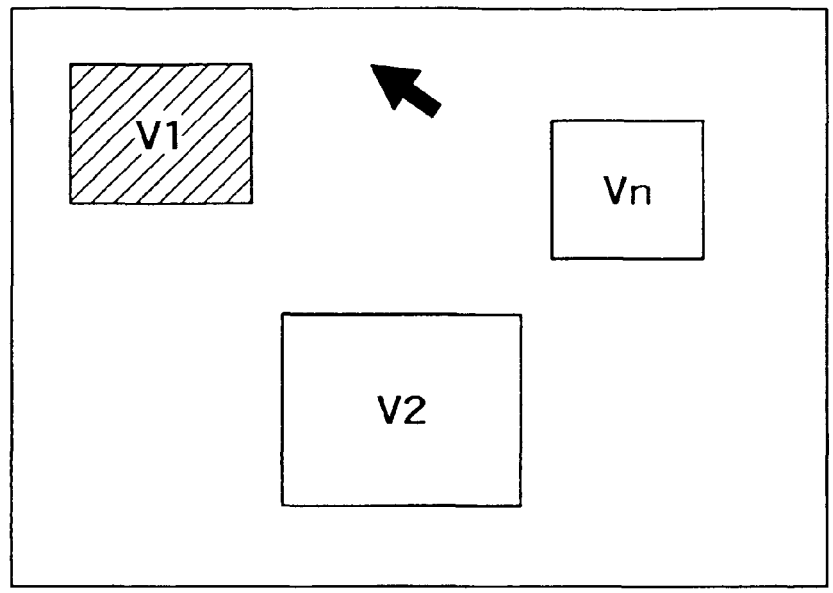
FIGS. 15(a)-(b) are diagrams illustrating examples of a composed image with an activated frame on a source image.
Figure 15B:
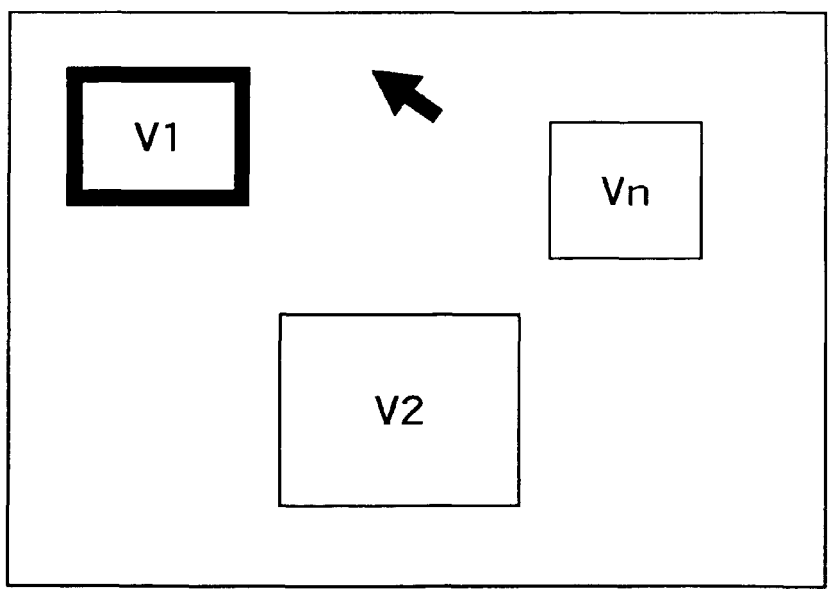

The common interface generator 13 may generate (a) a composed image of source images and (b) a composed image of pointer P and an activated frame. The activated frame may be designated as a colored layer overlaid on the activated source image (e.g., as in FIG. 15(a)). The activated frame also may be designated as a colored frame overlaid on the active source image (e.g., as in FIG. 15(b)).

Analyzer 14 analyzes the HID signal sent from viewer 3. Analyzer 14 outputs the analysis result (e.g., the pointer's position and clicked-on position in the composed image) to layout manager 12. Layout manager 12 edits the layout management table according to the analysis result. Layout manager 12 notifies analyzer 14 and image composer 11 a finish edit time.

In response to such notification, analyzer 14 determines the source image that pointer P is then on by using position information px, py, associated with source ID "p", and other layout information associated with source IDs. Analyzer 14 also determines the pointer's position on the determined source image. An example is described with FIG. 4 to FIG. 6(b). In FIGS. 5(a)-(b) and FIGS. 6(a)-(b), the upper left corner of source image V1 is located at position (x, y)=(15, 15) in composed image M. The size (w, h) of source image V1 is (25, 25). If the pointer's position (x, y) is (30, 30) when notification occurs, analyzer 14 detects that the pointer's position is in a rectangle indicating source image V1.

Analyzer 14 also determines the pointer's position on the determined source image. Specifically, at first, the position of the upper left corner of the source image on the composed image M (15, 15) is subtracted from the position of the pointer P on the composed image M (30, 30). The result of the subtraction (15, 15) is multiplied by the scaling factor (4, 4) between the absolute size (100, 100) and the size on the composed image M (25, 25) of the source image. Then, the pointer's position on the absolute source image V1 is calculated as (60, 60).

If the pointer's position on the composed image M is (20, 25) when notification occurs, the pointer's position on the absolute source image V1 is calculated as (20, 40). Analyzer 14 sends the pointer's position in the source image with the source ID of the source image and the click event, to operator 15 and layout manager 12. In response to receipt, operator 15 detects a network address of the source image generator for the source image, using the source ID. Operator 15 sends the pointer's position in the source image and the click event to the network address. Correspondence between the source ID and the network address of the source image generator is previously stored in MCU 1. Correspondence between the source generator ID and the network address of the source image generator may be detected on their first connection.

Figure 7:
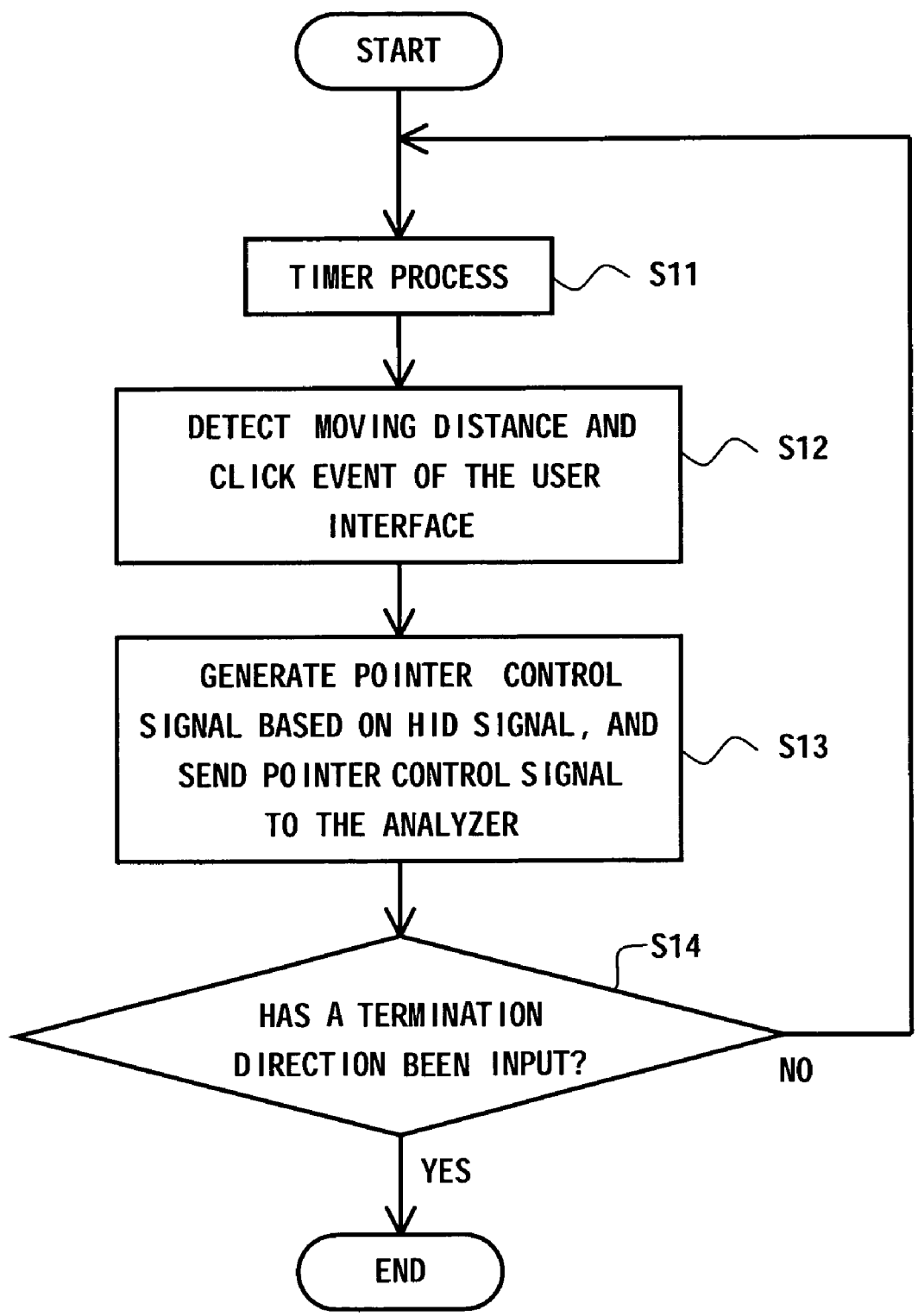
FIG. 7 is a flowchart illustrating a transmitter process.

Operations of transmitter 32 of viewer 3, analyzer 14, operator 15, and layout manager 12 of MCU 1 are described below with flowcharts. FIG. 7 is a flowchart of process of transmitter 32.

At first, transmitter 32 executes a timer process (S11), and detects moving distance and click event of the user interface (S12). That is, transmitter 32 periodically detects the pointer's state properties. Transmitter 32 generates the HID signal based on information of the moving distance on each of x direction and y direction and the click event, and sends the HID signal to analyzer 14 (S13). After S13, transmitter 32 determines whether a termination direction (e.g., release of a mouse click button) has been input or not. If transmitter 32 determines that a termination direction has been input, transmitter 32 terminates the process (YES branch of S14). If not, transmitter 32 executes step S11 again (NO branch of S14).

Figure 8:
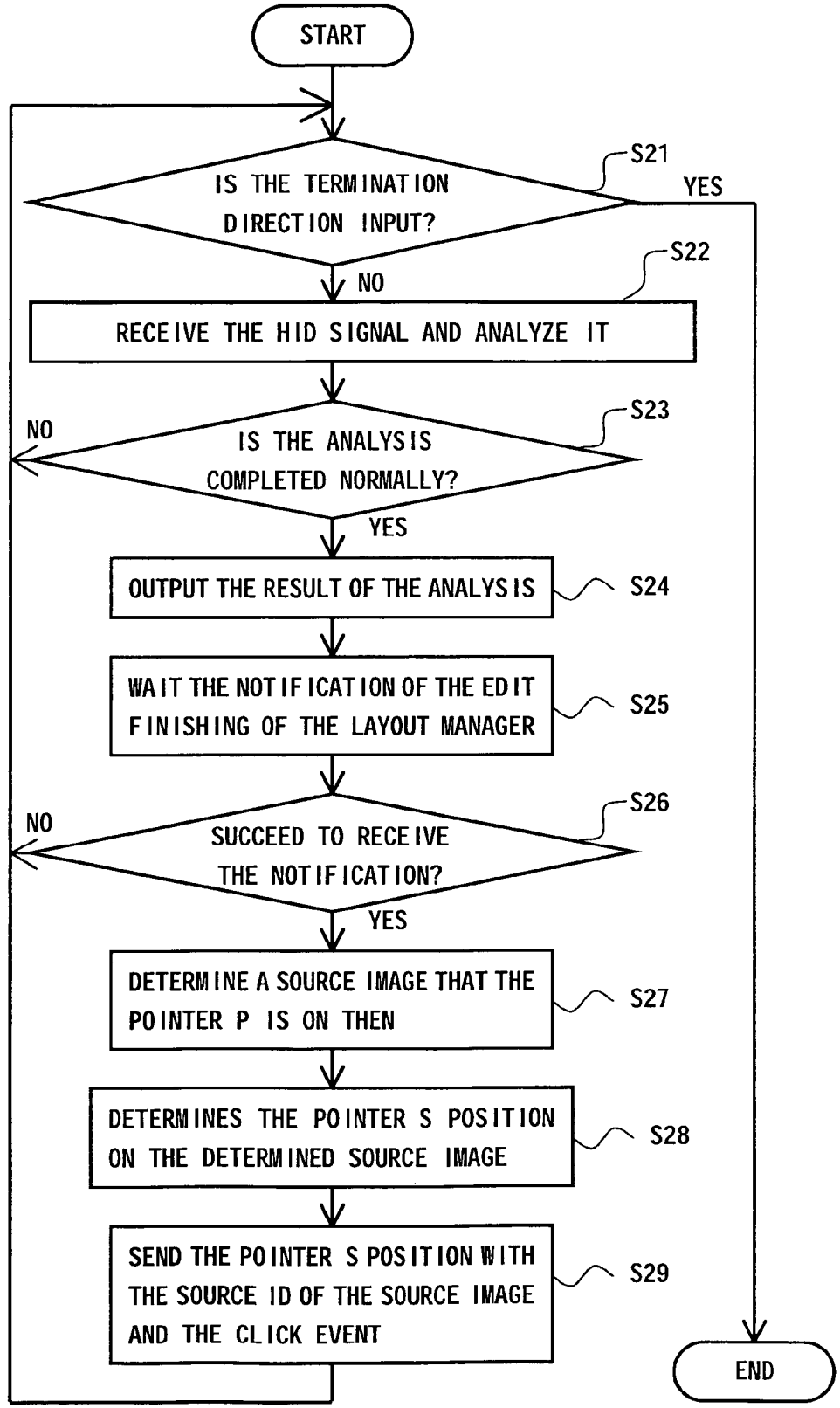
FIG. 8 is a flowchart illustrating an analyzer process.

FIG. 8 is a flowchart of the analyzer 14 process. At first, analyzer 14 determines whether the termination direction is input or not. If analyzer 14 determines that the termination direction is input, analyzer 14 terminates the flow (YES branch of S21). If not, analyzer 14 executes step S22 (NO branch of S21). Analyzer 14 receives the HID signal from transmitter 32, and analyzes it (S22). If the analysis is normally completed, analyzer 14 executes step S24 (YES of S23). If not, the analyzer 14 executes the step S21 again (NO of S23). Analyzer 14 outputs the result of the analysis such as the pointer's position and clicked position on the composed image to the layout manager 12 at step S24. Analyzer 14a waits notification of edit finishing of layout manager 12 at step S25. If analyzer 14 fails to receive the expected notification, analyzer 14 executes step S21 again (NO branch S26). If analyzer 14 receives the expected notification, it next determines a source image that pointer P is on at that time in step S27. Analyzer 14 determines the pointer's position on the determined source image at step S28 and then sends the pointer's position in the source image with the source ID of the source image and the click event, to operator 15 and layout manager 12 at step S29. After executing step S29, analyzer 14 executes step S21 again.

Figure 9:
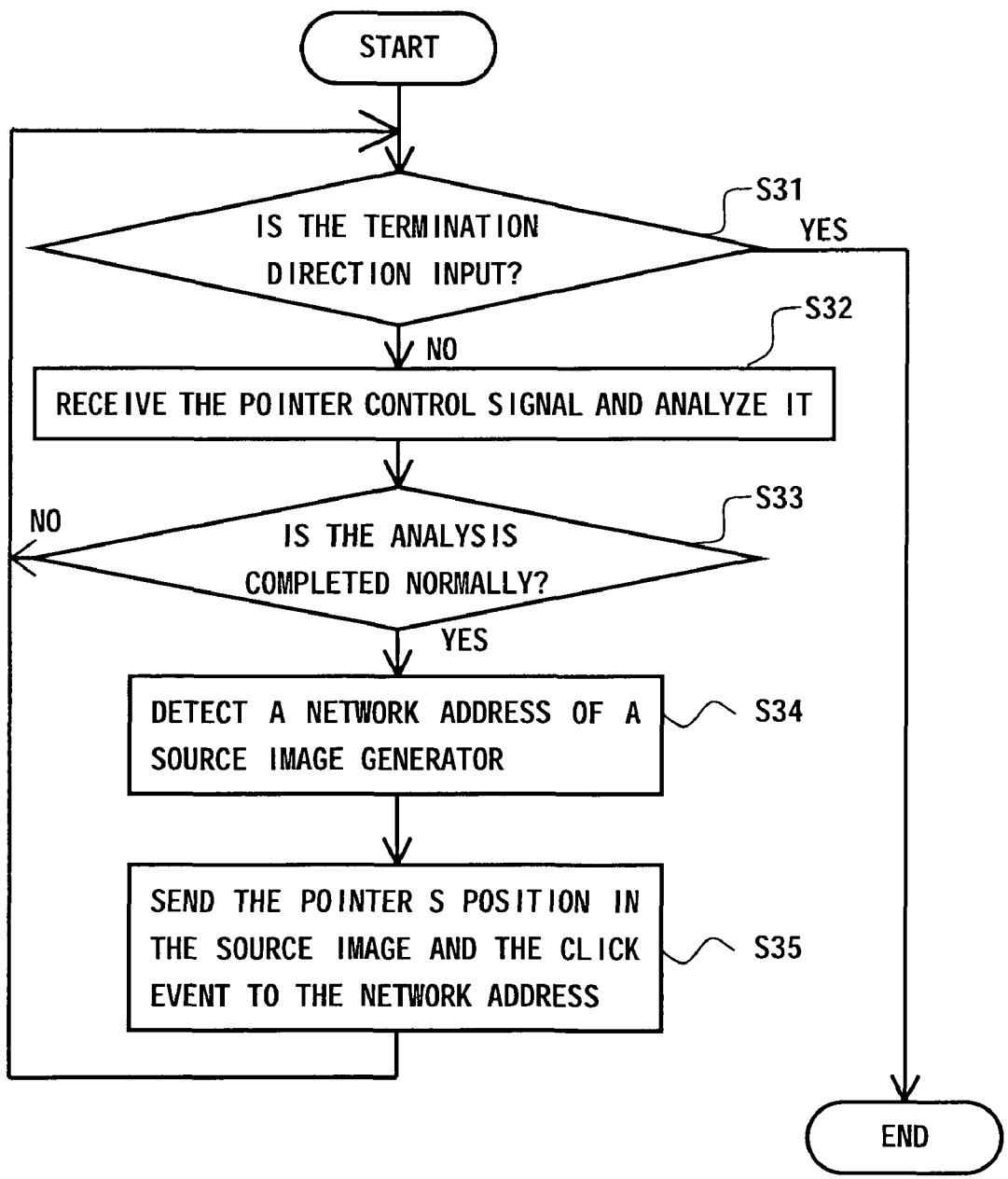
FIG. 9 is a flowchart illustrating an operator process.

FIG. 9 is a flowchart of the operator 15 process. At first, operator 15 determines whether the termination direction has been input or not. If operator 15 determines that the termination direction is input, it terminates the flow (YES branch of S31). If not, operator 15 executes step S32 (NO branch of S31). Operator 15 receives the control signal from analyzer 14, and analyzes it (S32). If the analysis is normally completed, operator 15 executes a step S34 (YES of S33). If not, operator 15 executes step S31 again (NO of S33). Operator 15 detects a network address of the source image generator that is a source of the source image, using the source ID (S34) and sends the pointer's position in the source image and the click event to the network address (S35). Operator 15 then executes step S31 again.

Figure 10:
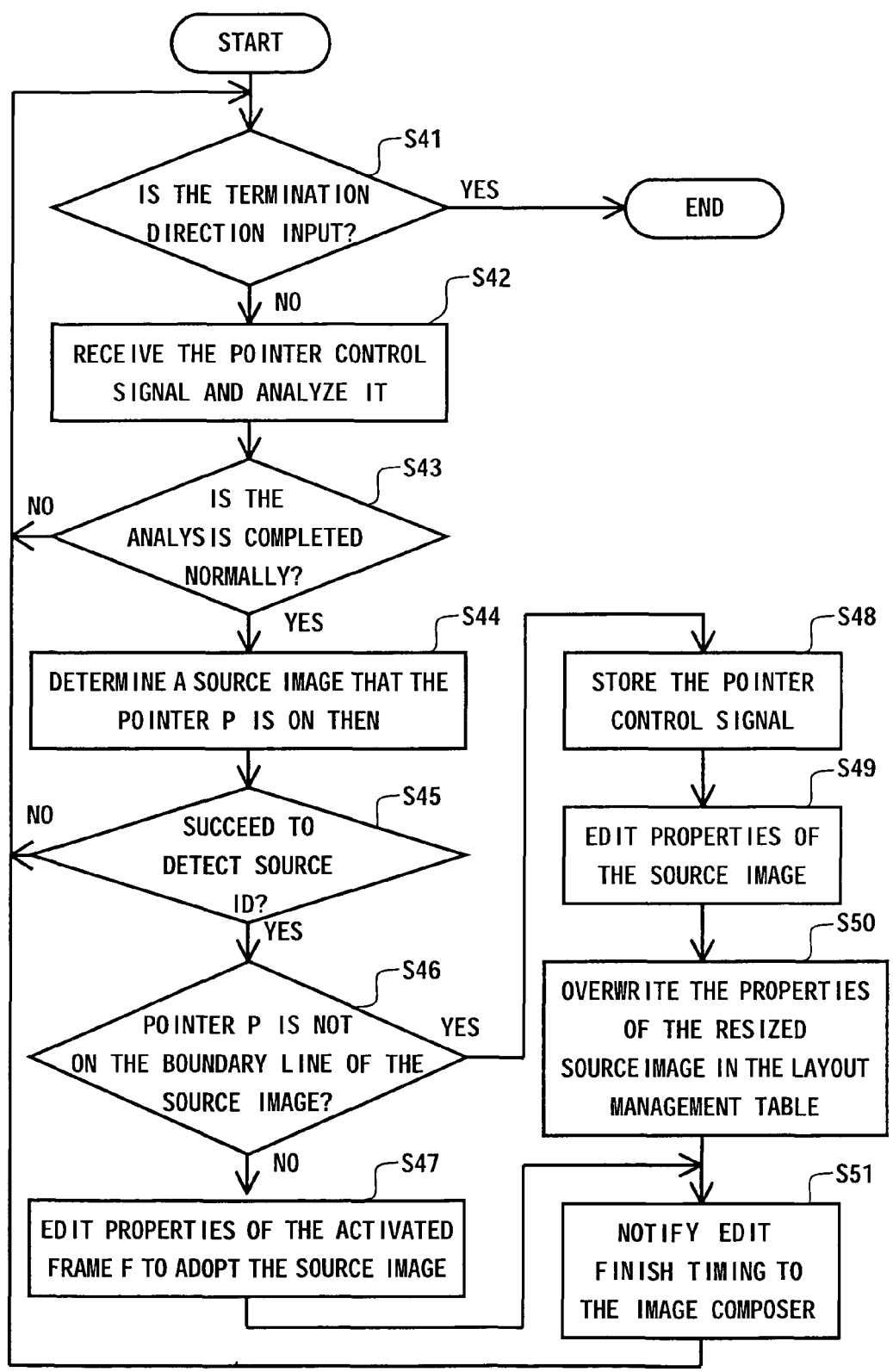
FIG. 10 is a flowchart illustrating a layout manager process.

FIG. 10 is a flowchart of the layout manager 12 process. At first, the layout manager 12 determines whether the termination direction is input or not. If the termination direction has been input, layout manager 12 terminates the flow (YES of S41). If not, layout manager 12 executes step S42 (NO of S41). Layout manager 12 receives the control signal from analyzer 14, and analyzes it (S42). If the analysis is normally completed, layout manager 12 executes step S44 (YES of S43). If not, layout manager 12 executes step S41 again (NO of S43). Layout manager 12 detects the source ID that is associated with a sources image that the pointer P is on at step S44. If the layout manager 12 fails to detect the source ID, it executes step S41 again (NO of S45). If layout manager 12 succeeds in detecting the source ID, it executes step S46 (YES of S45). Layout manager 12 determines whether pointer P is on a boundary line of the source image nor not. If pointer P is not on the boundary line, it executes step S47 (NO of S46). If Pointer P is on the boundary line, it executes step S48 (YES of S46). If pointer P is not on the boundary line, layout manager 12 edits properties of the activated frame F in the layout management table to adopt the source image associated with the source ID (S47). After that, layout manager 12 executes step S51.

If pointer P is on the boundary line, layout manager 12 temporally stores the control signal sent from the analyzer 14 (S48) and edits properties of the source image associated with the source ID, in the layout management table (S49). Layout manager 12 edits it according to control signals following the control signal temporally stored. This edit can resize the source image on the composed image. Layout manager 12 overwrites the properties of the resized source image in the layout management table (S50). Layout manager 12 notifies an edit finish timing to image composer 11 (S51). After that, layout manager 12 executes step S41 again.

Supplementary information for the layout manager 12 process shown in FIG. 10 is described below. In this embodiment, the image of pointer P is provided from common interface generator 13. That is, layout manager 12 updates properties of pointer P in the layout management table using the result of the analysis from transmitter 32 through analyzer 14. The image composer 11 puts the image of pointer P on the composed image according to the layout management table. For example, a layout of source images on the composed image M is shown in FIG. 11(a) and FIG. 11(b).

Figure 11A:
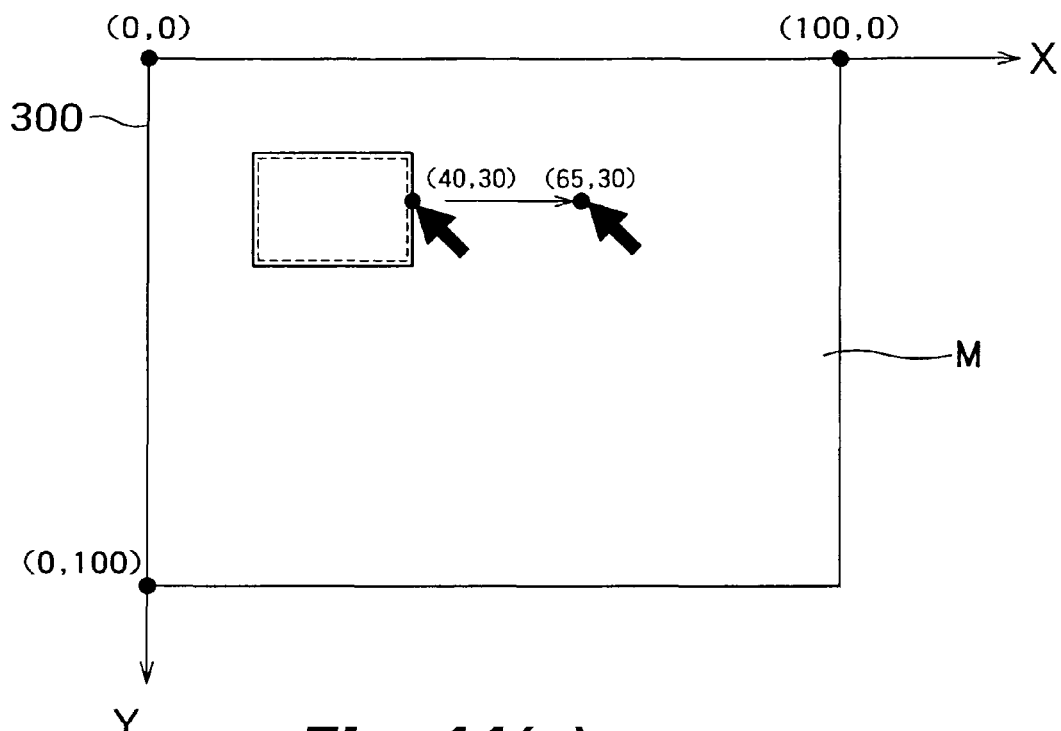
FIGS. 11(a)-(b) are diagrams illustrating a composed image where a boundary of a source image, and is dragged where the source image is moved to in the composed image.
Figure 11B:
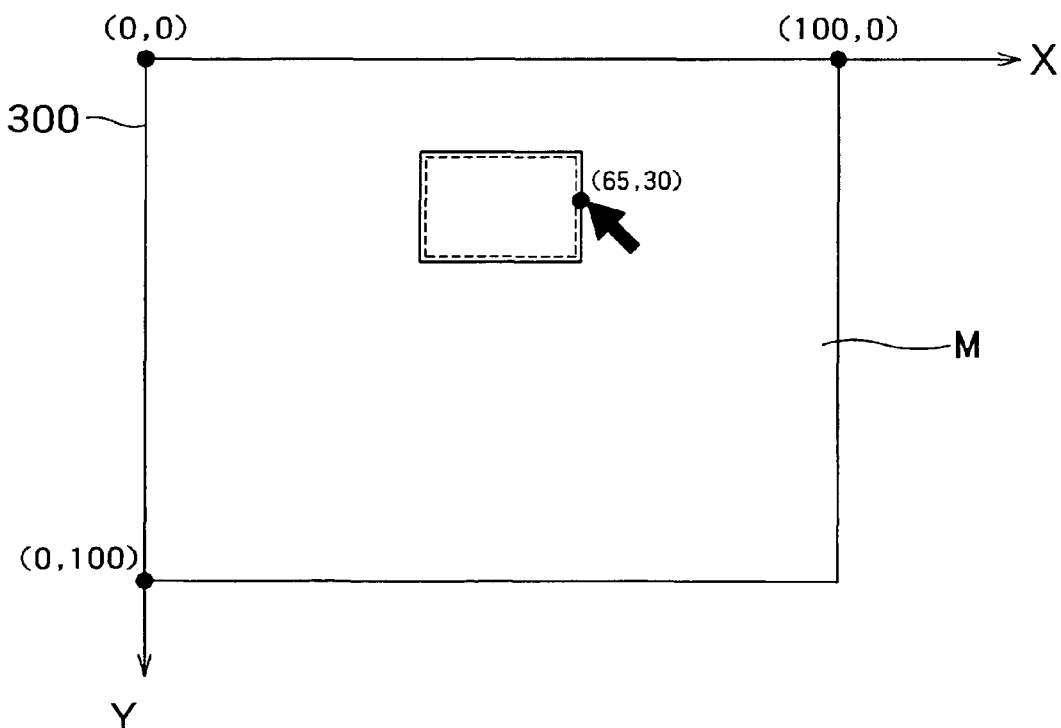

In FIG. 11(a), the boundary line (not corners) of the source image is dragged from position (x, y)=(40, 30) and moved to position (x, y)=(65, 30). Layout manager 12 can detect movement of pointer P with dragging of the boundary line of the source image on composed image M, and directs movement of the source image and pointer P to the image composer 11. FIG. 12(a) shows the layout management table before dragging like shown in FIG. 11(a), and FIG. 12(b) shows the layout management table after dragging and moving like shown in FIG. 11(b).

Figure 13A:
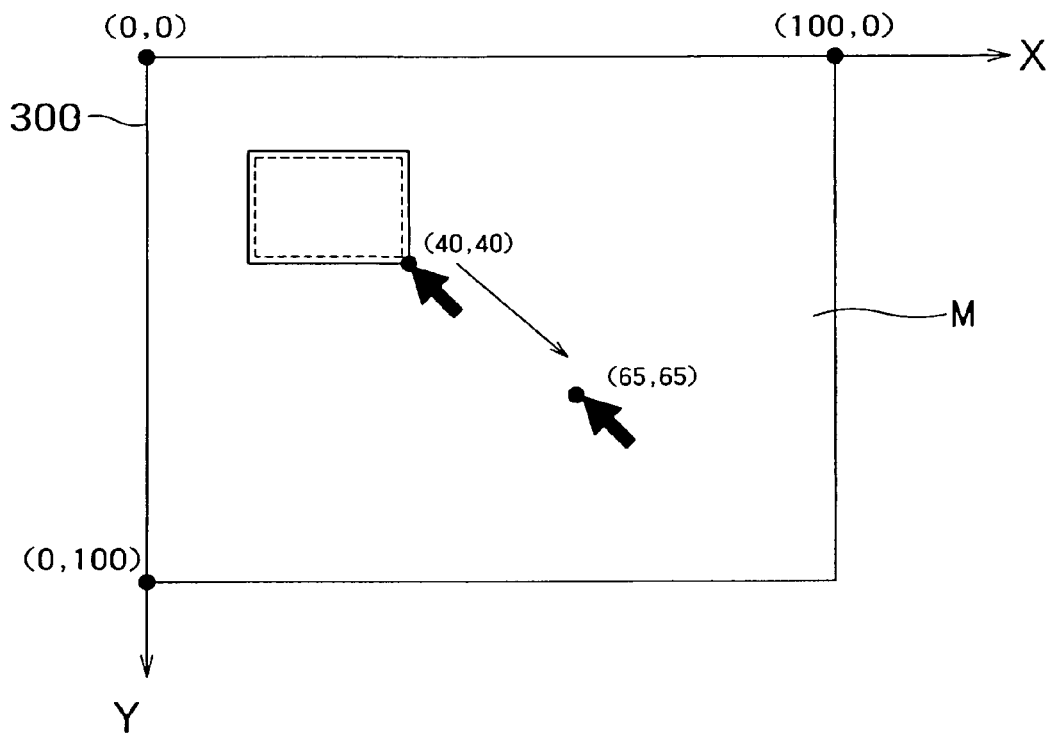
FIGS. 13(a)-(b) are diagrams illustrating a composed image where a corner of a source image to dragged and resized in the composed image.
Figure 13B:
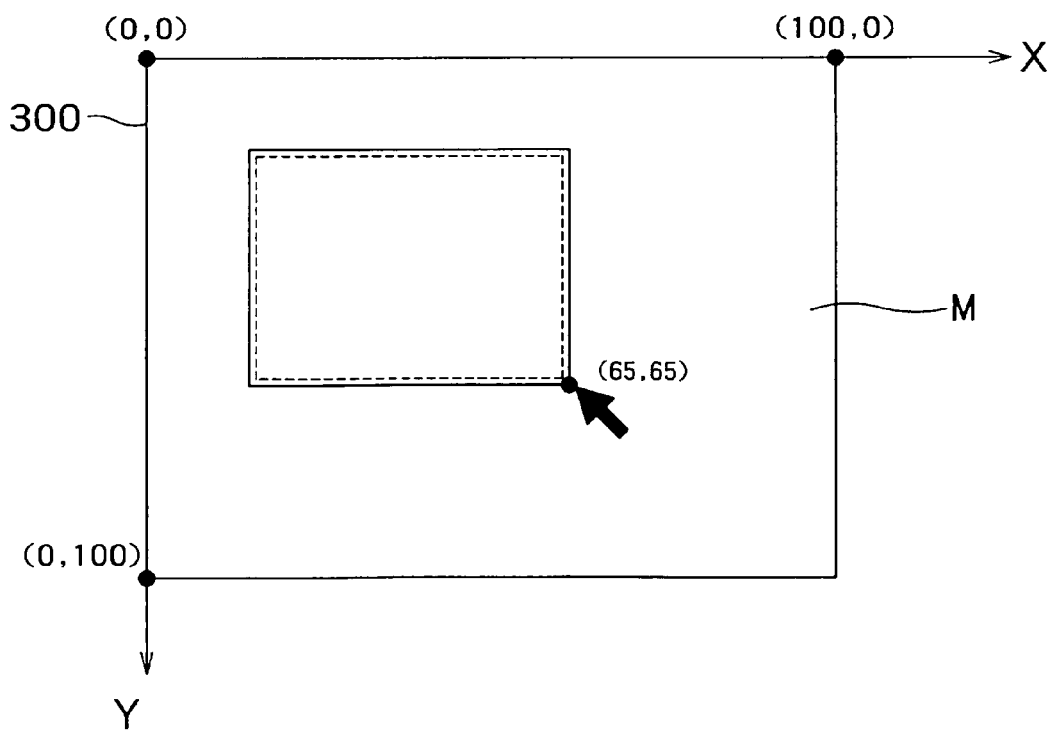

For example, a layout of source images on the composed image M is shown in FIG. 13(a) and FIG. 13(b). In FIG. 13(a), one corner (not the boundary line) of the source image is dragged from position (x, y)=(40, 40) and moved to position (x, y)=(65, 65). Layout manager 12 can detect movement of pointer P dragging the corner of the course image on the composed image M, and directs resizing the source image on the composed image and movement of pointer P to image composer 11. FIG. 14(a) shows the layout management table before dragging like shown in FIG. 13(a), and FIG. 14(b) shows the layout management table after dragging and resizing like shown in FIG. 14(b).

In addition, structure of the layout management table may be like shown in FIGS. 16(a)-(b) which has its focus on a column instead of the row F. The focus property of the activated source image may be "1", and focus properties of others may b "0". "Image composer 11 may use the focus property to detect the active source image.

Viewer 3 may have a device to provide the image and control the position of pointer P instead of common interface generator 13 of MCU 1.

Figure 17:
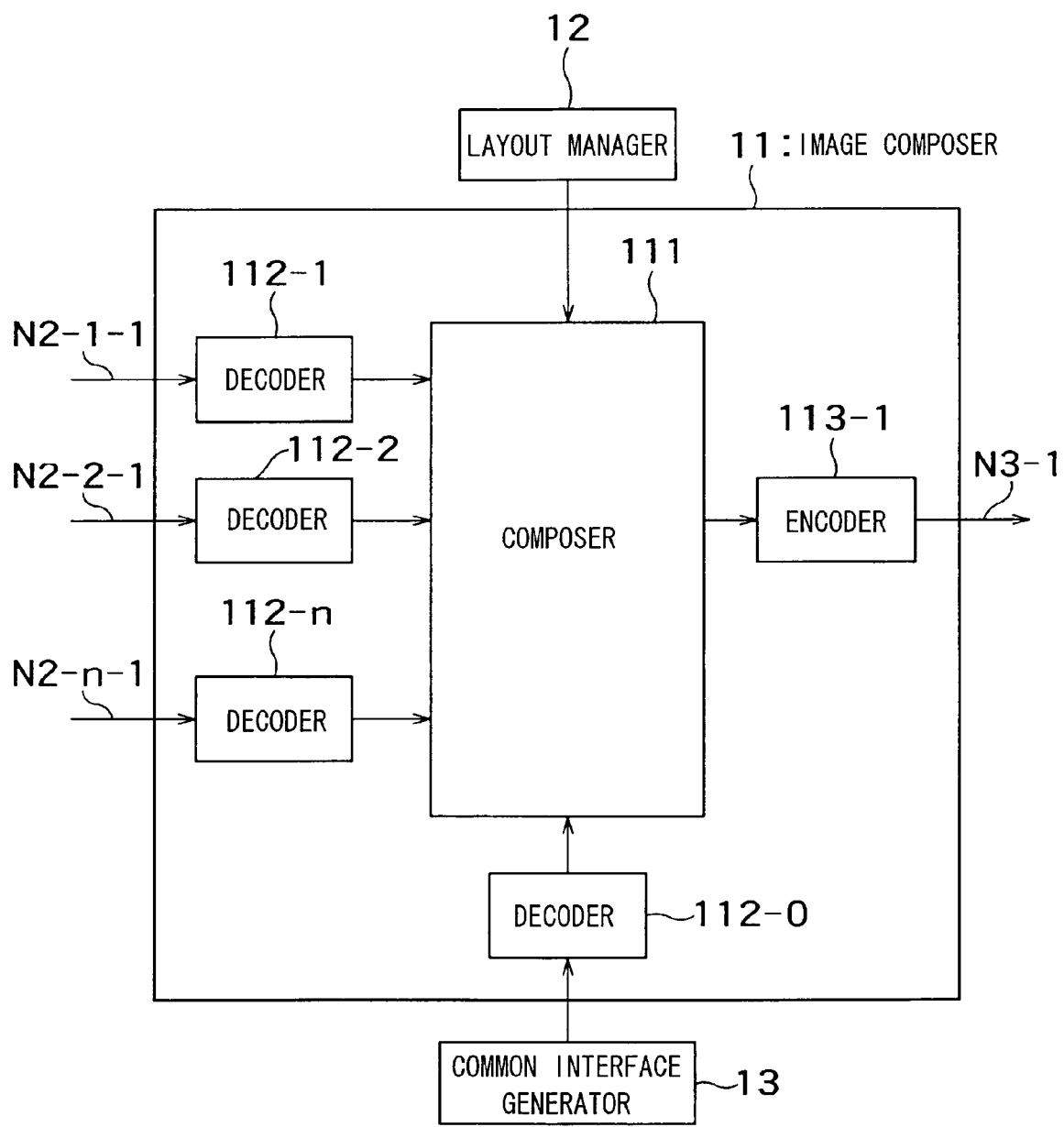
FIG. 17 is a diagram illustrating an image composer.

Supplementary information for image composer 11 process is described below. FIG. 17 illustrates a schematic diagram of an exemplary image composer 11 including composer 111, decoders 112-0 to 112-n, and encoder 113-1.

Decoder 112-0 decodes the image provided from common interface generator 13. Decoders 112-1 to 112-n decode source images sent from each of source image generator 2-1 to 2-n respectively. The images provided form common interface generator 13 or source image generators 2-1 to 2-n may be encoded based on MPEG4 standard.

Composer 111 obtains the source images and the image of pointer P from decoders 112-0 to 112-n, and composes them to the composed image M. Encoder 113-1 encodes composed image M.

Figure 18:
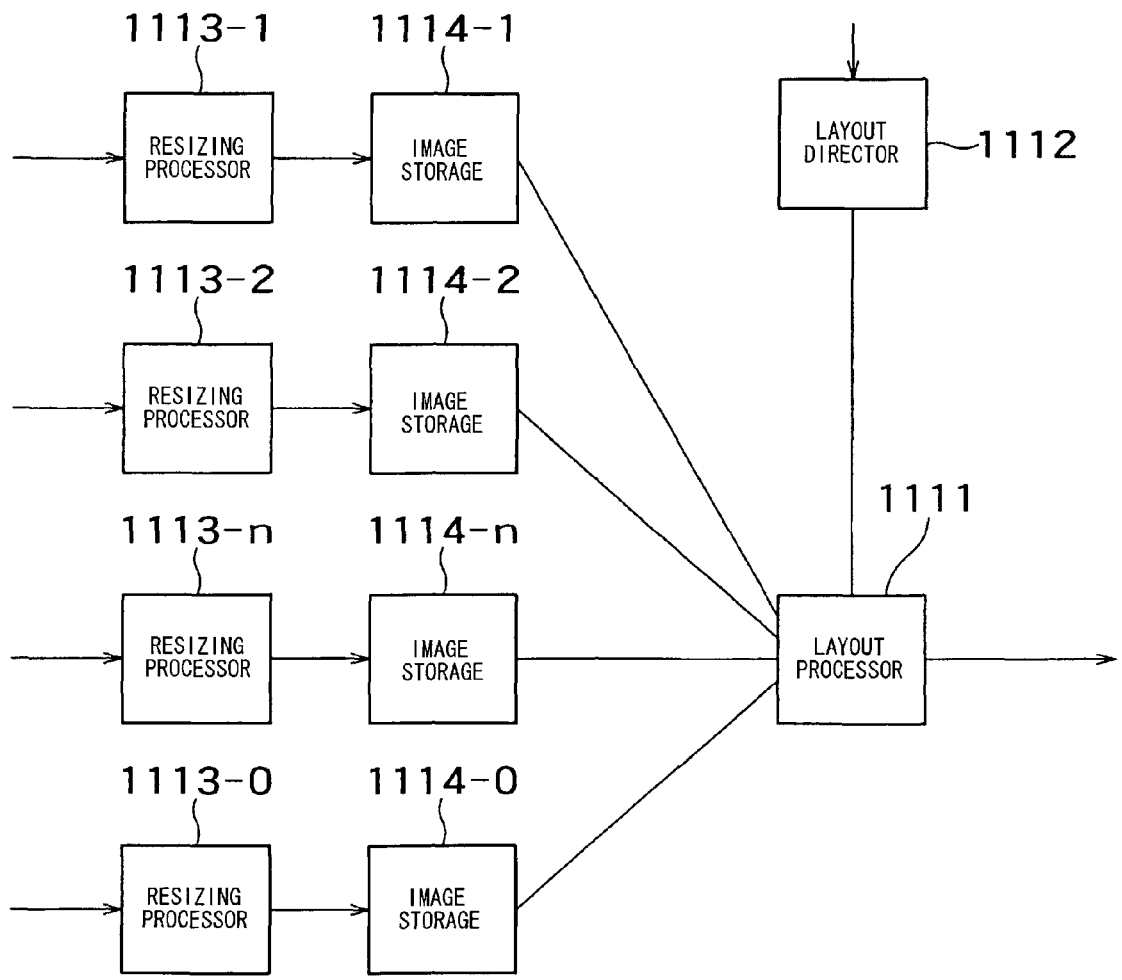
FIG. 18 is a diagram illustrating a composer.
Figure 19A:
FIGS. 19(a)-(e) are diagrams illustrating source images stored in an image store.
Figure 19B:
Figure 19C:
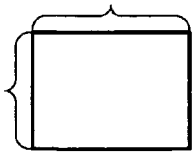
Figure 19D:
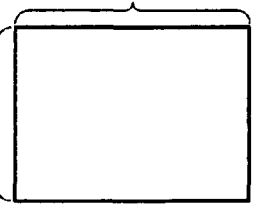
Figure 19E:
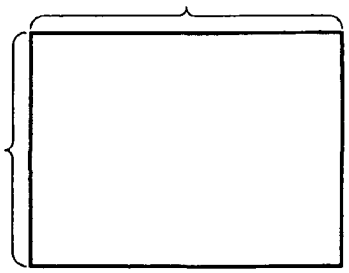

FIG. 18 illustrates a schematic diagram of an exemplary composer 111 including layout processor 1111, layout director 1112, resizing processors 1113-0 to 1113-n, and image storages 1114-0 to 1114-n. Resizing processors 1113-0 to 1113-n resize the decoded source images. Image storages 1114-0 to 1114-n store the resized source images. Image storages 1114-0 to 1114-n may store a plurality of images having sizes that are different from each other even if generated from the same decoded source, as shown in FIGS. 19(a) to 19(e).

Layout director 1112 obtains layout information from layout manager 12. Layout processor 1111 obtains resized source images stored in image storages 1114-0 to 1114-n, and lays them out on composed image M based on the direction of layout director 1112. As described above, source image generators 2-1 to 2-n provide source images respectively. MCU 1 composes those source images to composed image M. Viewer 3 displays composed image M. MCU 1 analyzes the event about pointer P which occurred at viewer 3. MCU 1 reflects the result of the analysis to the source image generator that is the source of the source image on which the viewer 3 operates with pointer P.

Figure 20A:
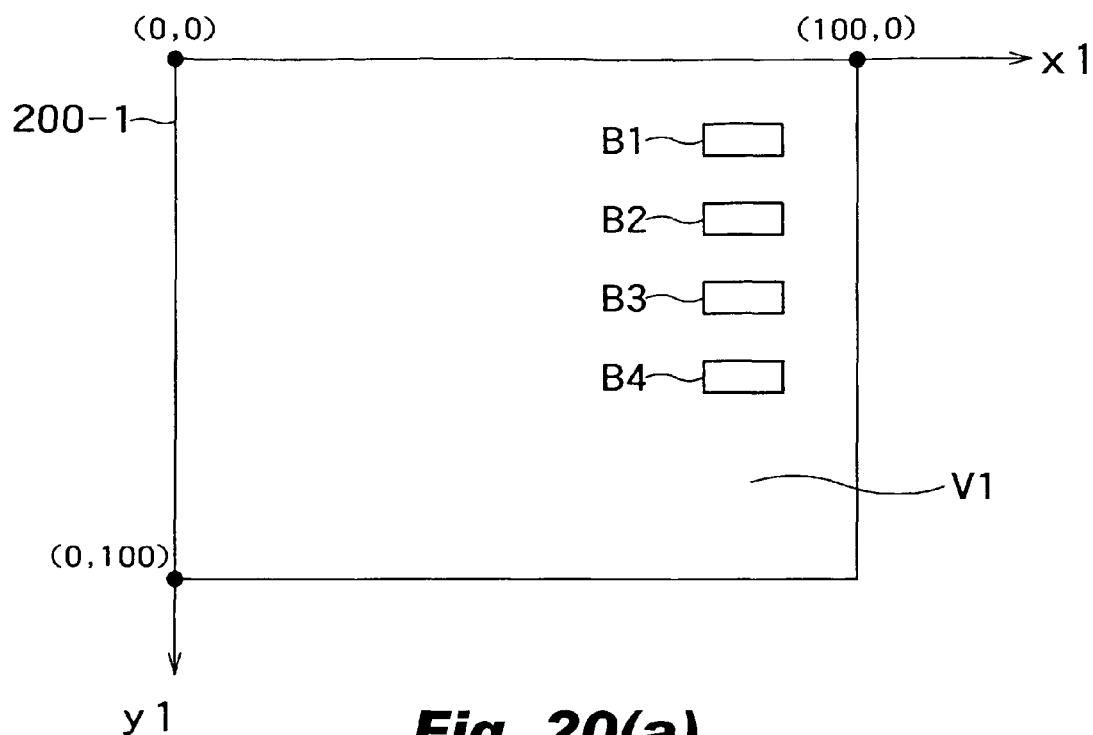
FIGS. 20(a)-(b) are diagrams illustrating source images with buttons in a composed image.
Figure 20B:
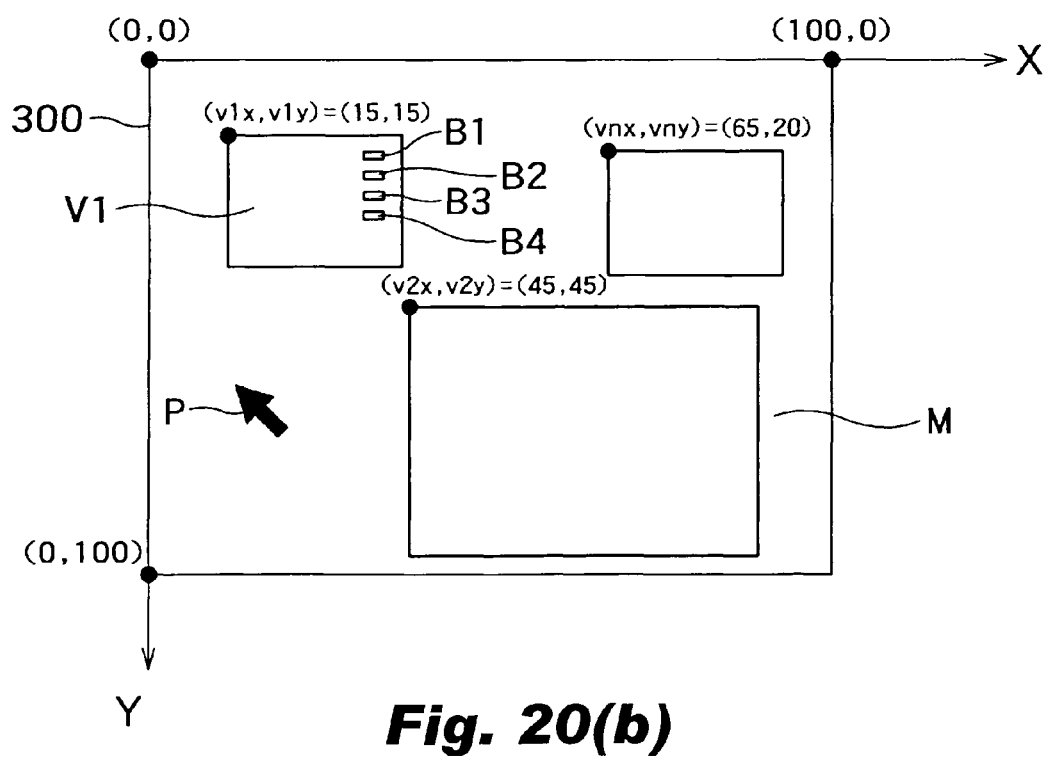

FIG. 20(a) is an example of source image V1 included in composed image M shown in FIG. 20(b). Source image V1 includes buttons B1 to B4 hose positions are defined with coordinate system 200-1. Source image generator 2-1 provides the image shown in FIG. 20(a) as source image V1. MCU 1 provides composed image M like shown in FIG. 29(b) to viewer 3. If buttons B1 to B4 are clicked on, the click event is notified to source image generator 2-1 through MCU 1. Source image generator 2-1 executes a process corresponding to the clicked button.

Buttons B1 to B4 are reduced together when source image V1 is reduced in the example described with FIG. 20. Such reduction may cause difficulty in accurately clicking the desired button(s) on composed image M because of their reduced size. A method to avoid such problems is described below for a second and third embodiment.

Second Embodiment

An example of a second non-limiting embodiment of a remote-control system is described using FIGS. 21(a) to FIG. 26 (supplementing to the FIGURES described above).

Figures 21A, 21B:
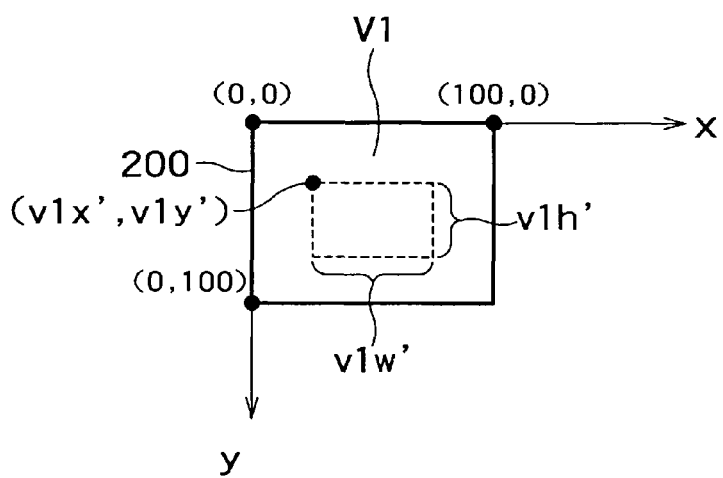
FIGS. 21(a)-(b) are examples of a layout management table and source images with coordinate systems according to second embodiment.

FIG. 21(a) is an example of layout information stored as layout management table in layout manager 12 in this embodiment. The layout management table has parameters (x', y', w', h') in addition to the layout management table described in the first embodiment. Those parameters (x', y', w', h') indicate an operative area.

The operative area indicates an area to be sent independently of MCU 1. That is, an image in the defined operative area is shown independently on the composed image displayed by viewer 3. In FIG. 21(b), a broken rectangle indicates the operative area. The parameters (x', y', w', h') are initialized as (0, 0, 100, 100) that indicates the operative area covers all the source image. When the parameters are the initial values, an image in the operative area may not be sent independently of MCU 1. When at least one of the parameters is different from the initial values, the image in the operative area may be sent independently of MCU1.

Figure 22:
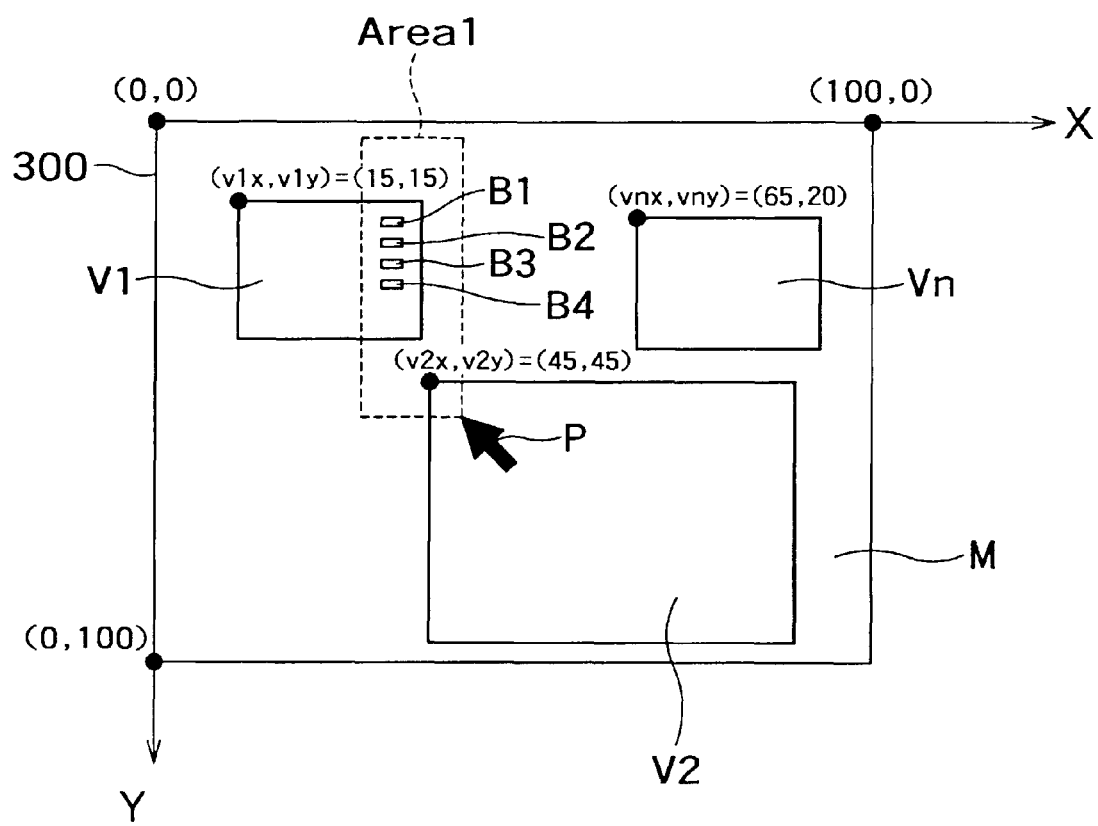
FIG. 22 is a diagram illustrating a source image with buttons in a composed image.

FIG. 22 is used to explain how the operative area is defined at viewer 3. The reference area is defined on display 31 shown with the broken-line rectangular Area1. The upper left corner of the reference area Area1 is located at (a1, a2) on composed image M. The lower right corner of the reference area Area1 is located at (a3, a4) on composed image M. The reference area Area1 may be defined by dragging the right button of the mouse from an upper left clicked-on position, and releasing the button at the lower right position. Transmitter 32 transmits a corresponding HID signal to analyzer 14 of MCU 1. Analyzer 14 detects the dragging and releasing pattern of the HID signal, and generates parameters defining the reference area.

In response to the received HID signal at analyzer 14, layout manager 12 executes operations described below.

(1) Layout manager 12 detects other source images overlapping the reference area determined by coordinates (a1, a2) and (a3, a4). The layout manager 12 determines source IDs of the detected source images.

(2) Layout manager 12 calculates overlap ratios for each of detected source images. The overlap ratio is a ratio of the area of the source image overlapping the reference area to the entire area of the source image. The layout manager 12 determines a source ID of a source image whose overlap ratio is the largest among the source images, as a target source ID. If there are two or more source images having the same and larges overlap ratio, the one of those source images whose layer is in front of another such source image is selected and its source ID is determined as the target source ID.

(3) Layout manager 12 regards the overlapping area of the source image corresponding to the target source ID determined in the above (2) as an operative area of the determined source image. Coordinates and sizes of the overlapping area are written into the layout management table as the properties (x', y', w', h') associated with the target source ID.

(4) Layout manager 12 adds a row to the layout management table. The additional row is a clone of the properties associated with the target source ID, but the source ID is new instead of the target source ID. The layer of the additional row is on the layer of the target source ID. The properties (x', y', w', h') of the additional row are the values calculated in (3) above. The property x of the additional row is the sum of the property x of the target source ID and a predetermined offset value for the coordinate. The property y of the additional row is sum of the property y of the target source ID and a predetermined offset for the y coordinate. Additionally, the new source ID is associated with a network address which the target source ID is associated with.

FIG. 23(a) illustrates an example of the layout management table before detection of the operative area. FIG. 23(b) illustrates an example of the layout management able after detection of the operative area.

The upper left corner of reference area Area1 is on (35, 5), and the lower right corner of reference area Area1 is on (47, 47), in the coordinate system 300 of FIG. 22. Furthermore, the properties of source image V1 (x, y, w, h) are defined as (15, 15, 25, 25), and the properties of source image V2 (x, y, w, h) are defined as (45, 45, 50, 50), just as in FIG. 23(a).

In this example, source images V1 and V2 overlap reference area Area1. Twenty percent of source image V1 overlaps reference area Area1 and 0.16 percent of source image V2 overlaps reference area Area1. Therefore, layout manager 12 determines source ID "V1" corresponding to source image V1 as the target source ID (i.e., because the overlap ratio of the source image V1 is the largest among the source images).

Properties of the overlapping area (x', y', w', h') written into the layout management table of FIG. 23(b) are (80, 0, 20, 100), and they are associated with a new source ID "cV1". A layer associated with source ID "cV1" is determined as "2" which is the same layer as target source ID "V1". This parameter set indicates that operative area of source image V1 on coordinate system 300. Layout manager 12 notifies an edit finish timing to image composer 11 which puts the image of the operative area of source image V1 onto the composed image according to parameters associated with the source ID "cV1" in the layout management table.

Figure 24:
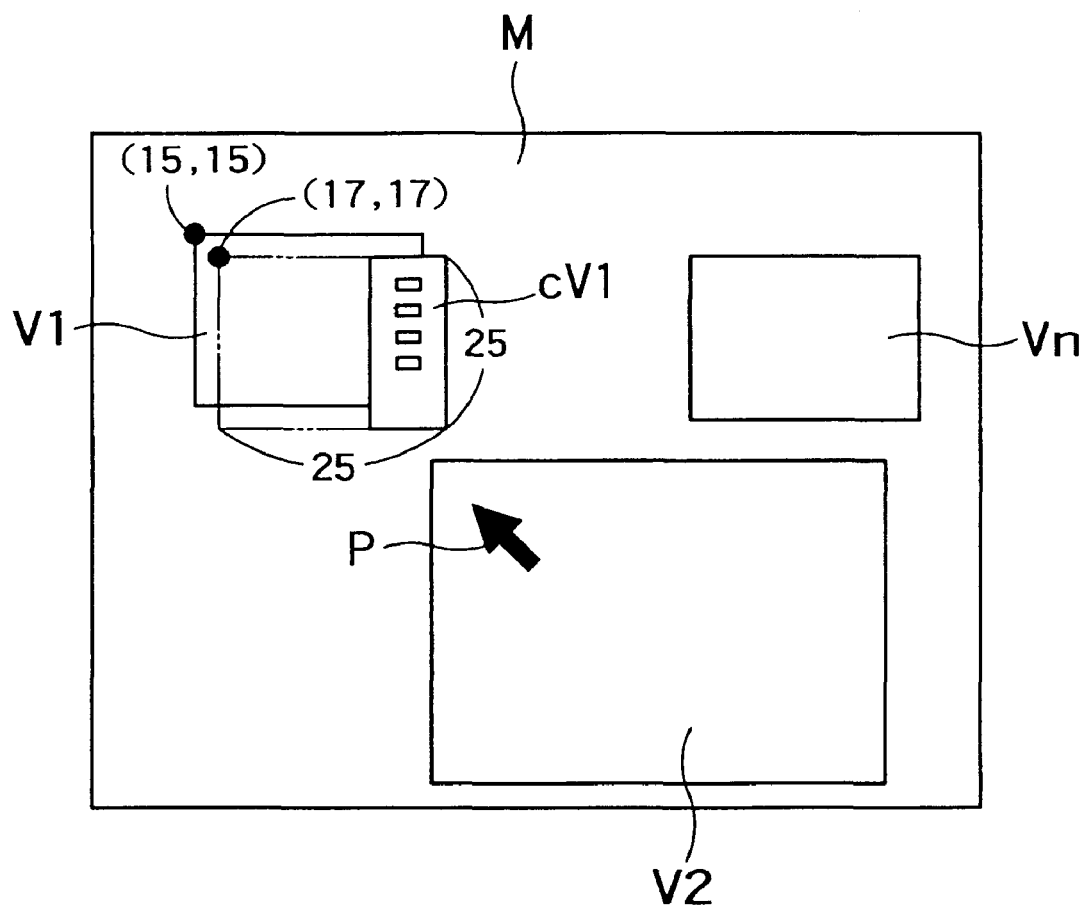
FIG. 24 is a diagram illustrating source images with buttons in a composed image, after detection of an operative area.
Figure 25:
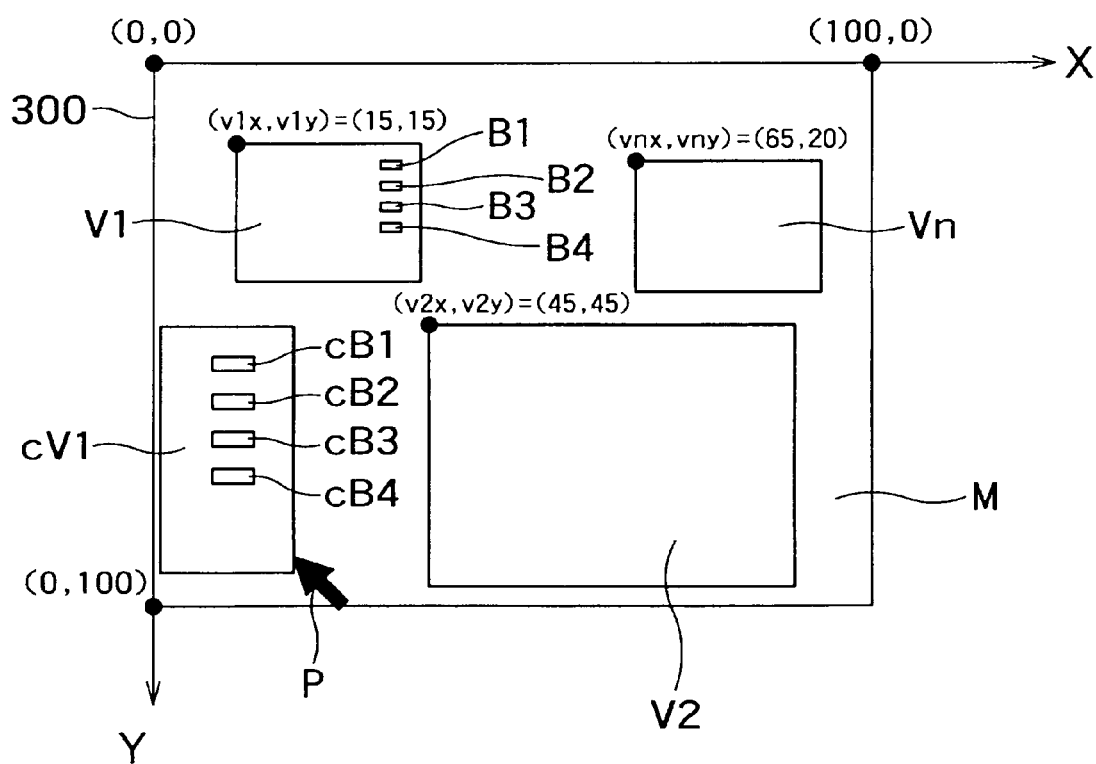
FIG. 25 is a diagram illustrating enlarged source images with buttons in a composed image.

FIG. 24 illustrates composed image M after layout manager 12 notifies an edit finish timing to image composer 11. In this FIGURE, source image cV1 is a partial overlap of source image V1, and shifted 2 coordinate points in each of x and y directions from the source image V1. The source image cV1 can be reformed independent of source image V1 by a pointer action on composed image M at viewer 3 the same as can other source images. FIG. 25 illustrates source image cV1 moved from the position illustrated in FIG. 24, to the lower left position. Additionally, source image cV1 is here enlarged compared to source image cV1 illustrated in FIG. 24.

FIG. 26 illustrates the layout management table according to FIG. 25. If one of buttons cB1, cB2, cB3, and cB4 is clicked on in composed image M on viewer 3, viewer 3 sends HID signals including information of a click event to MCU 1. MCU 1 analyzes the received HID signal, determines the clicked position on source image cV1, and sends information of the clicked position and the click event to source image generator of source image cV1. MCU 1 may have a function to detect a certain pattern of the HID signals for eliminating an image of the operative area. The certain pattern may be a double-click event on source image cV1. The certain pattern may be that there is no change of the HID signal during a certain time interval. In this embodiment, the image of the operative area can be enlarged independently of the source image. Therefore, difficulty of using control interfaces such as a reduced size button caused by reduction of the source image can be avoided.

Third Embodiment

Figure 27:
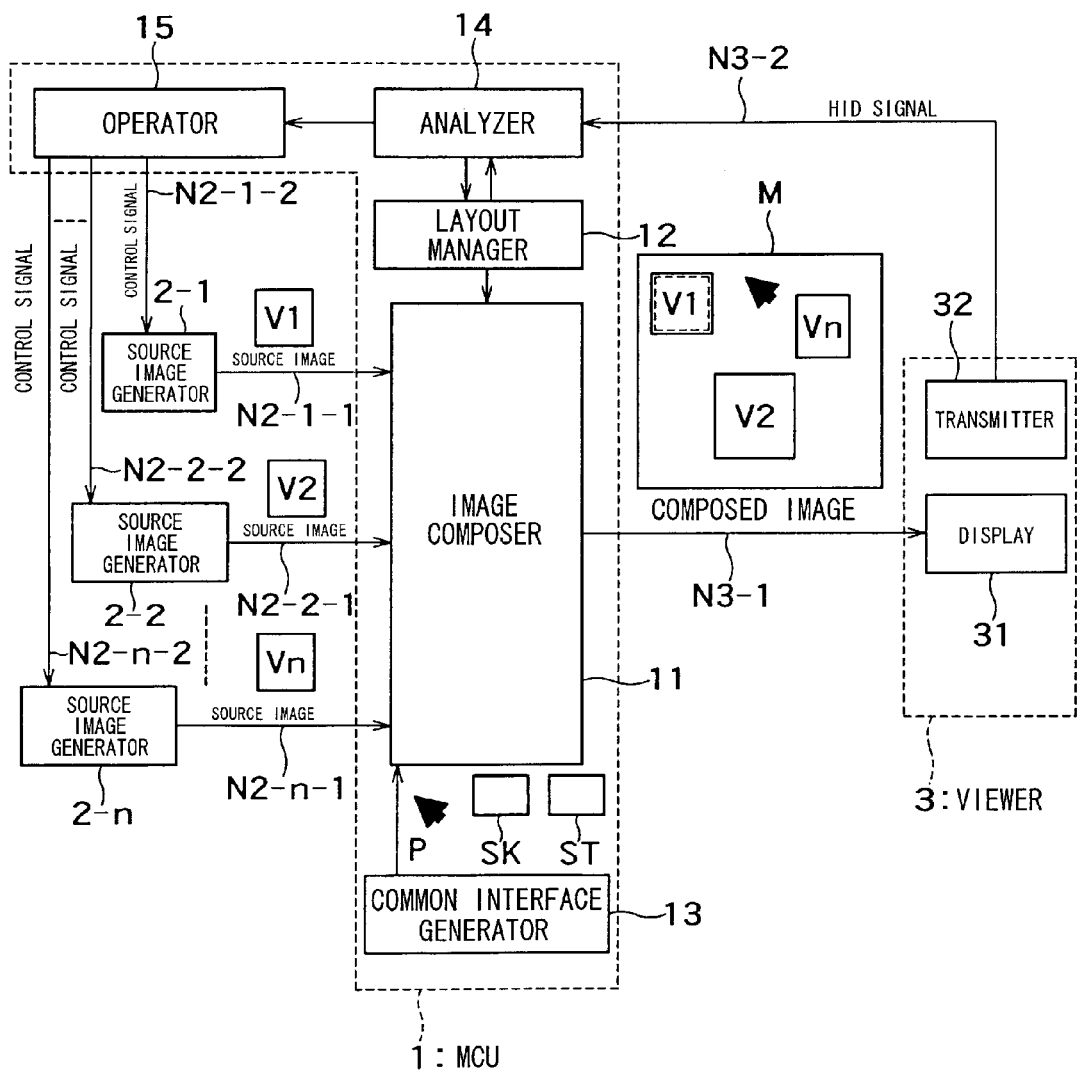
FIG. 27 is a diagram illustrating a remote-control system according to third embodiment.

An example of a third non-limiting embodiment of a remote-control system is described using FIG. 27 to FIG. 29 (supplementing the FIGURES described above).

Figure 28A:
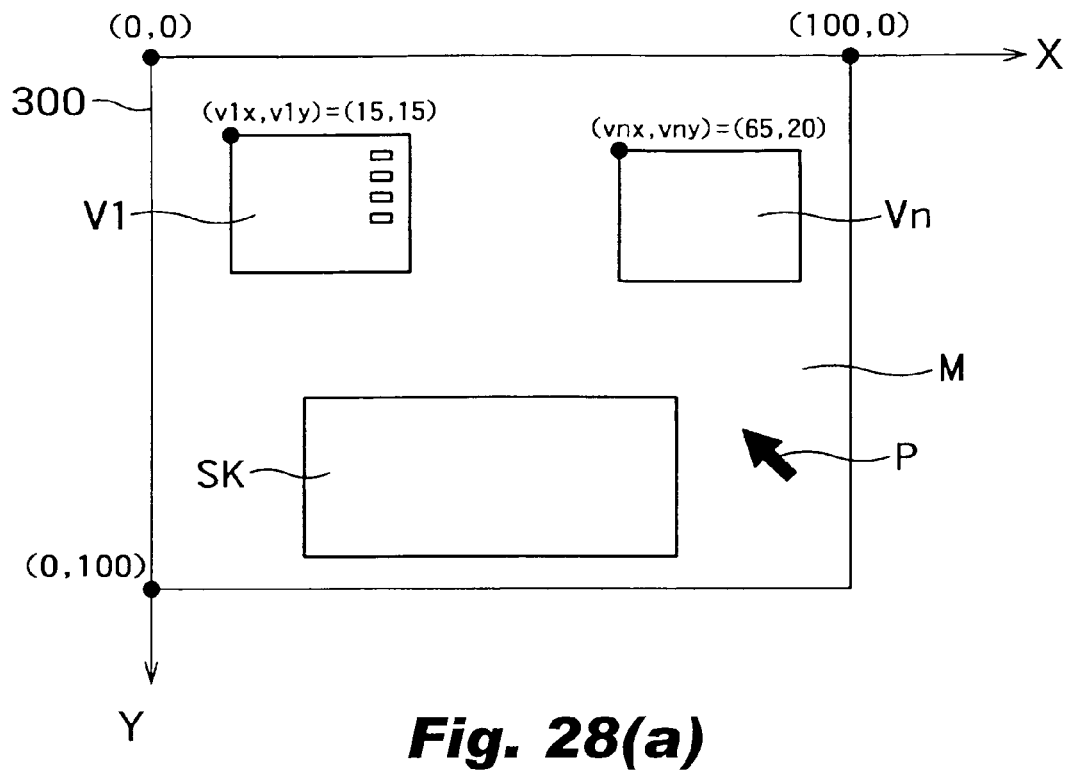
FIGS. 28(a)-(b) are diagrams illustrating a composed image including a software keyboard.
Figure 28B:
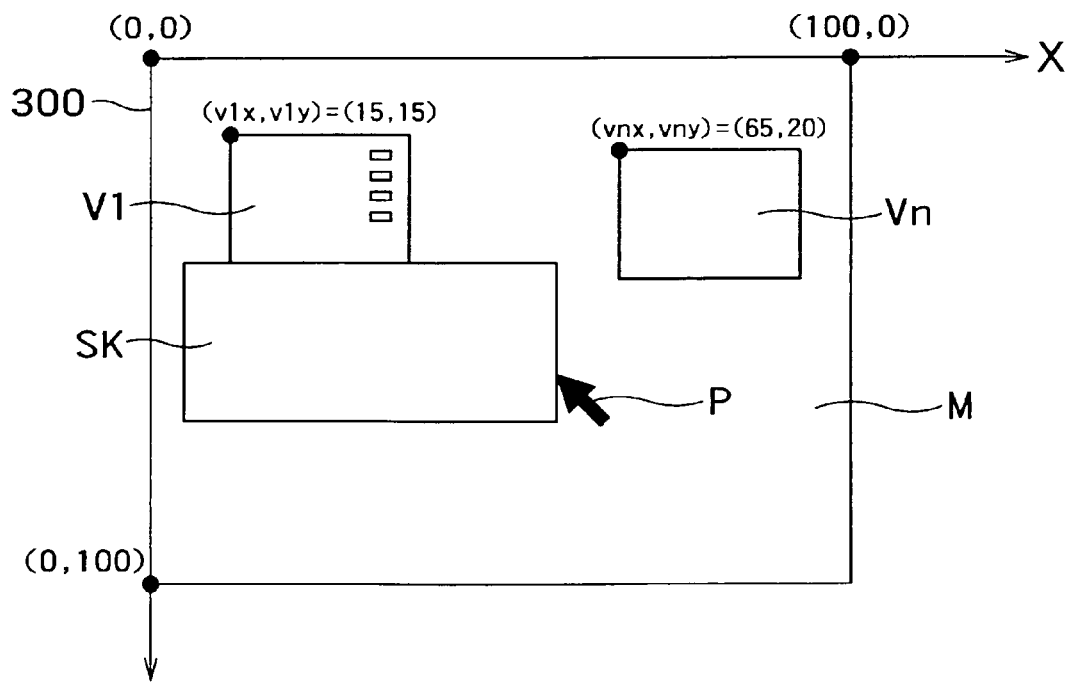

FIG. 27 illustrates a schematic diagram of an exemplary third non-limiting embodiment of a remote-control system. In this embodiment, common interface generator 13 uses the control signal, and common interface generator 13 outputs common interface control signals to operator 15. FIG. 28(a) and FIG. 28(b) illustrate composed image M including an image of a software keyboard SK. In FIG. 28(b), the software keyboard SK adjoins source image V1. The image of software keyboard SK includes a plurality of keys.

If the user controls pointer P onto a key of the software keyboard SK with the mouse and clicks the right button, an HID signal is sent from transmitter 32 of viewer 3 to analyzer 14 of MCU 1. Analyzer 14 analyzes the HID signal sent from viewer 3 and outputs the results of the analysis (e.g., such as the pointer's position and clicked position on the composed image) to layout manager 12. If analyzer 14 detects the click on software keyboard SK, it converts the clicked position of the pointer indicated by the HID signal with respect to coordinate system 300 to a position on software keyboard SK.

Analyzer 14 determines a source image that adjoins the image of the software keyboard SK in composed image M. Analyzer 14 sends the source ID of the adjoining source image to common interface generator 13. In the example of FIG. 28(b), analyzer 14 sends the source ID "V1" to common interface generator 13. Common interface generator 13 converts the clicked position on the software keyboard SK to a key code and then sends the source ID "V1" and the key code to operator 15 which, in turn, sends the key code to source image generator 2-1 that is associated with source ID "V1".

Analyzer 14 may send the source IDs of the source images, which are located within a predetermined distance from the software keyboard SK in composed image M, to common interface generator 13. Then, analyzer 14 sends such source IDs to common interface generator 13 which converts the clicked position on the software keyboard SK to a key code and sends the source IDs and the key code to operator 15. Operator 15 sends the key code to source image generators that are associated with the source IDs.

Analyzer 14 may send the source ID of the source image which overlaps the software keyboard SK in composed image M to common interface generator 13.

Figure 29A:
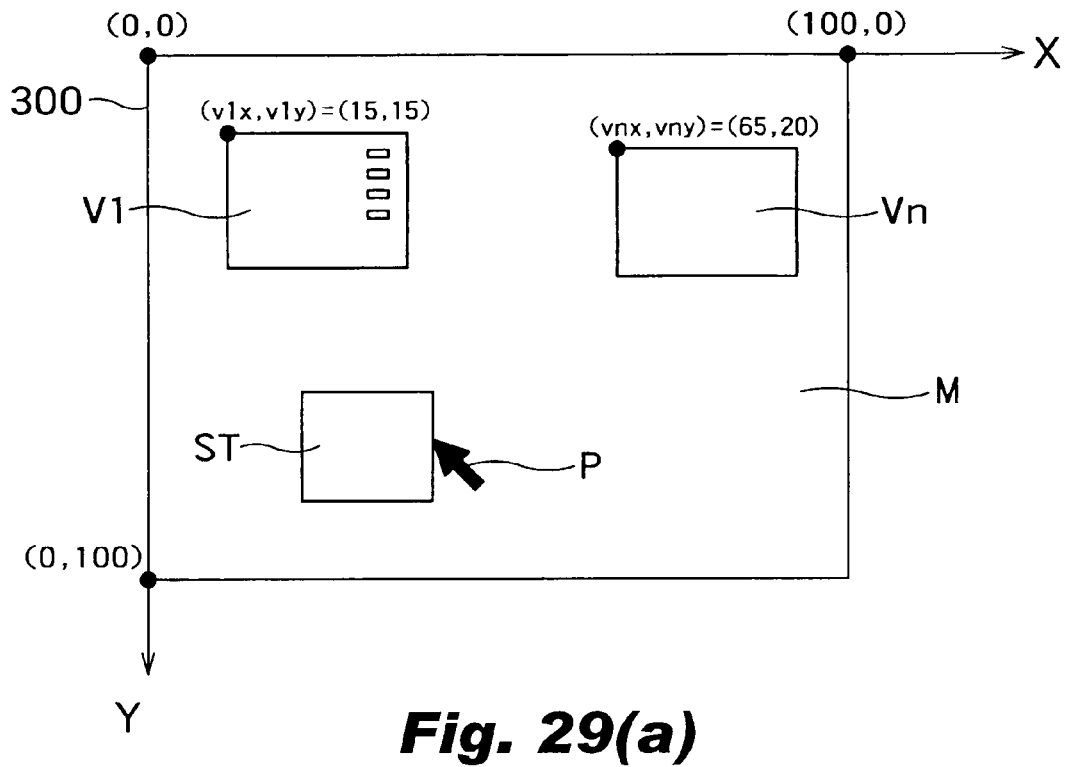
FIGS. 29(a)-(b) are diagrams illustrating a composed image including a software touchpad.
Figure 29B:
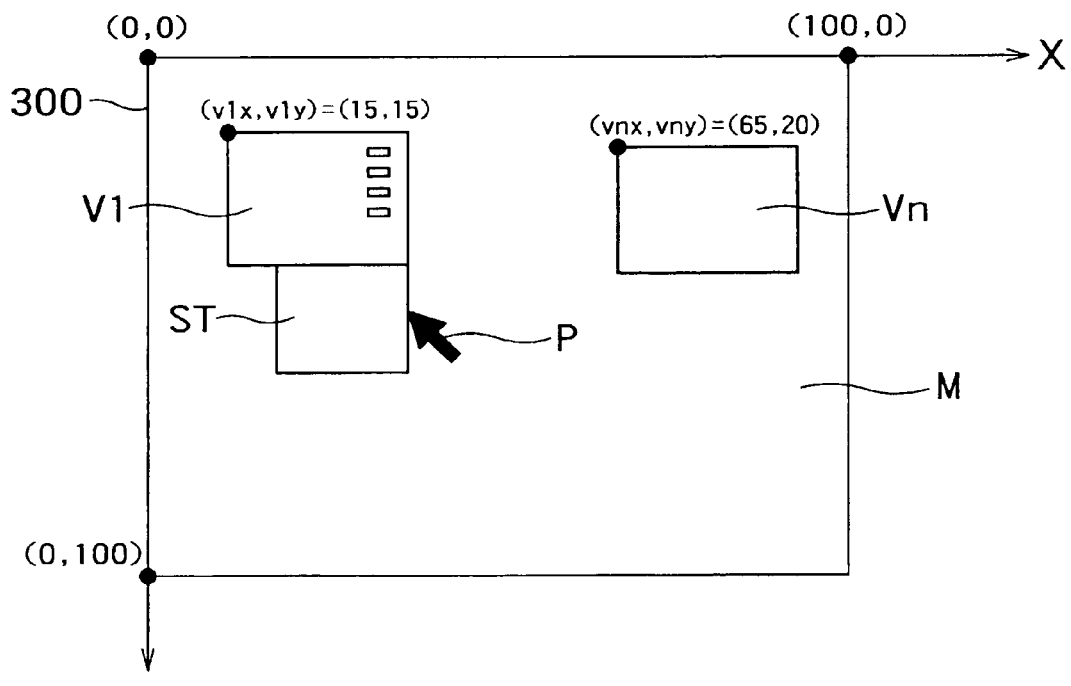

FIG. 29(a) and FIG. 29(b) illustrate composed image M including an image of software touchpad ST. In FIG. 29(b), the software touchpad ST adjoins source image V1. If the user controls pointer P on software touchpad ST by dragging the right button of the mouse (i.e., holding it clicked "on" from a fixed position while moving it to a new position), the HID signal is sent from transmitter 32 of viewer 3 to analyzer 14 of MCU. Analyzer 14 outputs the stroke of the pointer P to layout manager 12 and converts the stroke of the pointer P indicated by the HID signal with respect to coordinate system 300 to a stroke on software touchpad ST.

Analyzer 14 determines a source image that adjoins the image of the software touchpad ST in composed image M and sends its source ID to common interface generator 13. In the example of FIG. 29(b), analyzer 14 sends source ID "V1" to common interface generator 13. Common interface generator 13 sends source ID "V1" and the stroke on software touchpad ST to operator 15 which, in turn, sends the stroke on software touchpad ST to the source image generator 2-1 that is associated with source ID "V1".

In this embodiment, independent interfaces can be used instead of interfaces in the source image. Thus, a difficulty with control interfaces such as a reduced size button caused by reduction of source image can be avoided.

It will be understood by those in the art that numerous modifications and variations may be made in the above-described exemplary embodiments while yet retaining novel features and advantages. All such modifications and variations are intended to be included within the scope of the appended claims.

What is claimed is:

1. An image control apparatus for receiving source images defined with respective source coordinate systems from source image generators associated with respective source identifiers (IDs), composing the source images to generate a composed image defined with a composed coordinate system, and sending the composed image to a viewer which displays the composed image and outputs Human Interface Device (HID) signals defined with respect to the composed coordinate system, the image control apparatus comprising:

a layout manager configured to store source IDs respectively associated with layout information including position and size of at least one of the source images;

an image composer configured to generate the composed image by composing the source images according to the layout information;

an analyzer configured (a) to receive an HID signal sent from the viewer and to select one of the source images based on the HID signal and on the layout information, and (b) to convert the HID signal defined with respect to the composed coordinate system to a converted HID signal defined with respect to the source coordinate system of the selected source image; and an operator configured to send the converted HID signal to the source image generator corresponding to the selected source image, wherein the analyzer is further configured to (a) receive another HID signal for a reference area defined on the composed image, (b) calculate an overlap ratio of the reference area and each source image that overlaps the reference area, (c) determine the source image for which the overlap ratio is largest, (d) define an overlapping area of the reference area and the source image determined to have the largest overlap ratio as an operative area, and (e) replicate an image of the operative area on the composed image.

2. The apparatus as in claim 1, wherein the HID signal includes a pointer moving distance defined with respect to the composed coordinate system, and wherein:

the analyzer is configured to determine a source image that the pointer is on, and to convert the pointer position defined with respect to the composed coordinate system to a pointer position defined with respect to the source coordinate system of the source image that the pointer is on; and the operator is configured to send the pointer position defined with respect to the source coordinate system to the source image generator associated with the source image under the pointer.

3. The apparatus as in claim 1, wherein:

the image composer is configured to generate the composed image by composing an image of a software-defined HID and the source images according to the layout information;

the analyzer is configured to determine a source image relative to the software-defined HID according to the layout information, and to convert the HID signal to a converted HID signal which is an output of the software-defined HID; and the operator is configured to send the converted HID signal to the source image generator associated with the determined source image.

4. The apparatus as in claim 3, wherein:

the analyzer is configured to determine a source image which overlaps the software-defined HID according to the layout information.

5. The apparatus as in claim 3, wherein:

the analyzer is configured to determine a source image which adjoins the software-defined HID according to the layout information.

6. The apparatus as in claim 3, wherein:

the image composer is configured to generate the composed image by composing an image of a software-defined keyboard and the source images according to the layout information;

an analyzer is configured to determine a source image relative to the software-defined keyboard according to the layout information, and to convert a HID signal to a converted HID signal which includes a key code for the software-defined keyboard; and the operator is configured to send the converted HID signal to the source image generator associated with the determined source image.

7. The apparatus as in claim 3, wherein:
the image composer is configured to generate the composed image by composing an image of a software-defined touchpad and source images according to the layout information;
the analyzer is configured to determine a source image relative to the software-defined touchpad according to the layout information, and to convert a HID signal to a converted HID signal which includes a stroke on the software-defined touchpad; and
the operator is configured to send the converted HID signal to the source image generator associated with the determined source image.

8. The apparatus as in claim 1, wherein the replicated image is enlarged relative to a size of the operative area.

9. The apparatus as in claim 1, wherein the other HID signal is for a reference area defined by a dragging operation.

10. An image control method for controlling an apparatus which receives source images defined with respective source coordinate systems from source image generators associated with respective source identifiers (IDs), composes the source images to generate a composed image defined with respect to a composed coordinate system, and sends the composed image to a viewer which displays the composed image and outputs Human Device Interface (HID) signals defined with respect to the composed coordinate system, the method comprising:
storing source IDs respectively associated with layout information including position and size of at least one of the source images;
generating the composed image by composing the source images according to the layout information;
receiving an HID signal sent from the viewer to select one of the source images based on the HID signal and on the layout information
converting the HID signal defined with respect to the composed coordinate system to a converted HID signal defined with respect to the source coordinate system of the selected source image; and
sending the converted HID signal to the source image generator associated with the selected source image,
wherein the method further comprises
receiving another HID signal for a reference area defined on the composed image;
calculating an overlap ratio of the reference area and each source image that overlaps the reference area;
determining the source image for which the overlap ratio is largest;
defining an overlapping area of the reference area and the source image determined to have the largest overlap ratio as an operative area; and
replicating an image of the operative area on the composed image.

11. The method as in claim 10, wherein the replicated image is enlarged relative to a size of the operative area.

12. The method as in claim 10, wherein the other HID signal is for a reference area defined by a dragging operation.

13. A method for controlling composed composite images using human interface device (HID) signals based on a coordinate system associated with the composed images, the method comprising:
storing source identifiers (IDs) respectively associated with layout information including position and size of at least one source image used to compose a composite image;
receiving an HID signal sent from a viewer for viewing the composite image and selecting one of the source images based on the HID signal and on the layout information, and converting the HID signal to a converted HID signal defined with respect to a source coordinate system of the selected source image;
sending the converted HID signal to a source image generator associated with the selected source image;
receiving another HID signal for a reference area defined on the composed image;
calculating an overlap ratio of the reference area and each source image that overlaps the reference area;
determining the source image for which the overlap ratio is largest;
defining an overlapping area of the reference area and the source image determined to have the largest overlap ratio as an operative area; and
replicating an image of the operative area on the composed image.

14. The method as in claim 13 wherein the HID signal includes a pointer moving distance defined with respect to the composed coordinate system, the method further comprising:
determining a source image that the pointer is on, and converting the pointer position to a converted pointer position defined with respect to the source coordinate system of the source image that the pointer is on; and
sending the converted pointer position to a source image generator associated with the source image under the pointer.

15. The method as in claim 13 further comprising:
generating the composed image by composing an image of a software-defined HID and source images according to the layout information;
determining a source image relative to the software-defined HID according to the layout information,
converting the HID signal to a converted HID signal which is an output of the software-defined HID; and
sending the converted HID signal to the source image generator associated with the determined source image.

16. The method as in claim 15 further comprising:
determining a source image which overlaps the software-defined HID according to the layout information.

17. The method as in claim 15 further comprising:
determining a source image which adjoins the software-defined HID according to the layout information.

18. The method as in claim 15 further comprising:
generating the composed image by composing an image of a software-defined keyboard and source images according to the layout information;
determining a source image relative to the software-defined keyboard according to the layout information,
converting a HID signal to a converted HID signal which includes a key code for the software-defined keyboard; and
sending the converted HID signal to the source image generator associated with the determined source image.

19. The method as in claim 15 further comprising:
generating the composed image by composing an image of a software-defined touchpad and source images according to the layout information;
determining a source image relative to the software-defined touchpad according to the layout information;

converting a HID signal to a converted HID signal which includes a stroke on the software-defined touchpad; and sending the converted HID signal to the source image generator associated with the determined source image.

20. The method as in claim 13, wherein the replicated image is enlarged relative to a size of the operative area.

21. The method as in claim 13, wherein the other HID signal is for a reference area defined by a dragging operation.

22. A non-transitory computer program storage medium containing an image control program for execution by a computer for use in receiving source images defined with respective source coordinate systems from source image generators associated with respective source identifiers (IDs), composing the source images to generate a composed image defined with respect to a composed coordinate system, and sending the composed image to a viewer which displays the composed image and outputs Human Interface Device (HID) signals defined with respect to the composed coordinate system, the program including instructions for causing the computer to perform steps comprising:

storing source IDs respectively associated with layout information including position and size of at least one of the source images;

generating the composed image by composing the source images according to the layout information;

receiving an HID signal sent from the viewer and selecting one of the source images based on the HID signal and on the layout information converting the HID signal defined with respect to the composed coordinate system to converted HID signal defined with respect to the source coordinate system of the selected source image;

sending the converted HID signal to the source image generator corresponding to the selected source image;

receiving another HID signal for a reference area defined on the composed image;

calculating an overlap ratio of the reference area and each source image that overlaps the reference area; determining the source image for which the overlap ratio is largest;

defining an overlapping area of the reference area and the source image determined to have the largest overlap ratio as an operative area; and replicating an image of the operative area on the composed image.

23. The program storage medium as in claim 22, wherein the replicated image is enlarged relative to a size of the operative area.

24. The program storage medium as in claim 22, wherein the other HID signal is for a reference area defined by a dragging operation.

* * * * *